(12) United States Patent
Qu et al.

(10) Patent No.: US 12,495,468 B2
(45) Date of Patent: Dec. 9, 2025

(54) DATA TRANSMISSION METHOD APPLIED TO ACCESS NETWORK AND DEVICE

(71) Applicant: Huawei Technologies Co., Ltd., Shenzhen (CN)

(72) Inventors: Kaiyang Qu, Hangzhou (CN); Qufang Huang, Shenzhen (CN); Haiyan Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 526 days.

(21) Appl. No.: 17/956,000

(22) Filed: Sep. 29, 2022

(65) Prior Publication Data

US 2023/0023138 A1 Jan. 26, 2023

Related U.S. Application Data

(63) Continuation of application No. PCT/CN2020/082529, filed on Mar. 31, 2020.

(51) Int. Cl.
*H04W 74/08* (2024.01)
*H04L 5/00* (2006.01)
*H04W 74/0833* (2024.01)
*H04W 80/02* (2009.01)

(52) U.S. Cl.
CPC ........... *H04W 80/02* (2013.01); *H04L 5/0048* (2013.01); *H04W 74/0841* (2013.01)

(58) Field of Classification Search
CPC .......................... H04W 80/02; H04W 74/0841; H04L 5/0048; H04L 5/0051
USPC .................................................. 370/329–330
See application file for complete search history.

(56) References Cited

U.S. PATENT DOCUMENTS

| 2008/0025314 | A1 | 1/2008 | Lee et al. | |
|---|---|---|---|---|
| 2015/0181468 | A1 | 6/2015 | Diachina et al. | |
| 2016/0057055 | A1* | 2/2016 | Barrett | H04W 72/20 370/329 |
| 2016/0234714 | A1* | 8/2016 | Basu Mallick | H04W 72/21 |
| 2017/0273072 | A1* | 9/2017 | Wittberg | H04W 76/27 |
| 2018/0205808 | A1 | 7/2018 | Yang et al. | |
| 2021/0014893 | A1* | 1/2021 | Park | H04L 5/0092 |
| 2021/0282002 | A1* | 9/2021 | Sèbire | H04W 28/0268 |
| 2021/0352525 | A1* | 11/2021 | Hong | H04L 1/1614 |

FOREIGN PATENT DOCUMENTS

| CN | 102377803 A | 3/2012 |
|---|---|---|
| WO | 2004028041 A1 | 4/2004 |
| WO | 2016191969 A1 | 12/2016 |

OTHER PUBLICATIONS

Kyocera, "PDCP and RLC functionalities for D2D", 3GPP TSG-RAN WG2 #87, R2-143757, Aug. 17-22, 2014, 6 Pages, Dresden, Germany.

* cited by examiner

*Primary Examiner* — Candal Elpenord
(74) *Attorney, Agent, or Firm* — Slater Matsil, LLP

(57) ABSTRACT

A data transmission method applied to an access network and a device, the method including receiving, by a radio access network (RAN) device of an access network, a first data packet from a first terminal device, wherein the first data packet comprises a logical channel identifier (LCH ID), determining, by the RAN device, whether the LCH ID meets a first preset rule, and sending, by the RAN device, in response to determining that the LCH ID meets the first preset rule, the first data packet through a common radio link control (RLC) entity.

20 Claims, 13 Drawing Sheets

| MAC subheader | R | F | LCH ID | | | |
| --- | --- | --- | --- | --- | --- | --- |
| | Length (length) | | | | | |
| RLC subheader | D/C | P | SI | R | R | SN |
| | SN | | | | | |
| | SN | | | | | |
| | SO | | | | | |
| | SO | | | | | |
| PDCP subheader | UE ID (PDCP ID) | | | | | |
| | PDCP SN | | | | | |
| SDAP subheader | SDAP header (header) | | | | | |
| Data payload | Data (data) | | | | | |

Header part read and explained by a DU (a) Data packet generated by a UE (in other words, a data packet received by the DU)

| PDCP subheader | UE ID (PDCP ID) |
| --- | --- |
| | PDCP SN |
| SDAP subheader | SDAP header |
| Data payload | Data (data) |

(b) Data packet sent by the DU to a CU (in other words, the data packet received by the CU)

FIG. 6

DATA TRANSMISSION METHOD APPLIED TO ACCESS NETWORK AND DEVICE

CROSS-REFERENCE TO RELATED APPLICATIONS

This application is a continuation of International Application No. PCT/CN2020/082529, filed on Mar. 31, 2020, the disclosure of which is hereby incorporated by reference in its entirety.

TECHNICAL FIELD

This application relates to the field of communication technologies, and in particular, to a data transmission method applied to an access network and a device.

BACKGROUND

Currently, a base station in an access network may be deployed in a distributed manner. To be specific, protocol layer functions of the base station are separated and deployed. Functions of a service data adaptation protocol (SDAP) sublayer and a packet data convergence protocol (PDCP) of the base station are deployed in a centralized unit (CU) for centralized control, and functions of a medium access control (MAC) sublayer and a radio link control (RLC) sublayer of the base station are deployed in a distributed unit (DU). The CU may control at least one DU in a centralized manner.

An access network in a wireless communication system needs to establish a data resource bearer (DRB) for data transmission. Each time the access network establishes a DRB, the following processes need to be performed: establishes an radio resource control (RRC) connection; the CU establishes a dedicated N3 tunnel between the CU and a user plane function (UPF) network element in a core network; the CU establishes a dedicated PDCP entity and SDAP entity inside the CU; the CU and the DU establish an F1 tunnel between the CU and the DU; and an RLC entity further needs to be established inside the DU. After the foregoing processes are completed, the terminal device can transmit data over the access network. When the terminal device enters an RRC idle mode, a DRB of the terminal device is released, and certainly, each transmission resource corresponding to the DRB is also released.

In a small data transmission scenario, to reduce a data transmission delay, a concept of an RRC inactive mode is introduced. When the terminal device is in the inactive mode, an N3 tunnel, a PDCP entity, and an SDAP entity that correspond to the DRB of the terminal device are maintained, and the F1 tunnel and the RLC entity are released. When having a data transmission requirement, the terminal device in the inactive mode needs to first perform processes such as RRC connection resume and establishment of an RLC entity and a dedicated F1 tunnel. When a relatively large quantity of terminal devices have requirements for small data transmission, the DU and the CU in the access network need to perform the foregoing processes for each terminal device. Consequently, processing processes on the CU and the DU are still increased, and excessive signaling resources and transmission resources are consumed.

SUMMARY

This application provides a data transmission method applied to an access network and a device, to simplify data transmission between the access network and a terminal device.

According to a first aspect, an embodiment of this application provides a data transmission method. The method may be applied to a communication system shown in FIG. 1. In the communication system, a base station is deployed in a distributed structure. The method is performed by a radio access network (RAN) device. In some implementations, the RAN device may be a DU. In some other implementations, the RAN device may be a base station. The RAN device includes a common RLC entity. The common RLC entity has a capability of transmitting data packets of a plurality of terminal devices. The method includes the following steps.

After receiving a first data packet from a first terminal device, the RAN device determines whether a logical channel identifier (LCH ID) in the first data packet meets a first preset rule, or determines whether the first data packet includes a first dedicated indicator, and if the LCH ID in the first data packet meets the first preset rule or the first data packet includes the first dedicated indicator, the RAN device sends the first data packet through the common RLC entity. The first dedicated indicator is used to indicate the RAN device to send, through the common RLC entity, a data packet that includes the first dedicated indicator.

According to the method, in some scenarios, if an LCH ID of a data packet sent by the user equipment (UE) meets the first preset rule, the RAN device no longer performs some processes such as RRC connection resume and RLC entity establishment for the terminal device, to accelerate data transmission between an access network and the terminal device, so that data transmission efficiency between the access network and the terminal device can be improved.

In addition, in a solution in which the RAN device determines, by determining whether the LCH ID in the first data packet meets the first preset rule, whether the first data packet needs to be sent through the common RLC entity, because a structure of each data packet includes the LCH ID, this solution is implemented without changing the structure of the data packet, and makes few changes to a communication standard and protocol used in the communication system. In a solution in which the RAN device determines, by determining whether the first data packet includes the first dedicated indicator, whether the first data packet needs to be sent through the common RLC entity, because an operation such as numerical analysis does not need to be performed on the first dedicated indicator, the RAN device can quickly and accurately obtain a determining result according to this solution.

In a possible design, the first preset rule may be one or a combination of the following, including the LCH ID is greater than a first preset value, the LCH ID is less than a second preset value, the LCH ID is between a third preset value and a fourth preset value, the LCH ID is greater than a fifth preset value or less than a sixth preset value, where the fifth preset value is greater than the sixth preset value, and a quantity of bits of the LCH ID is equal to a first set value, or is set to a random bit string other than a dedicated LCH ID value.

The first dedicated indicator may be a bit string with a preset value, for example, represented by "1" or "11".

In a possible design, the first preset rule or the first dedicated indicator may be predefined, for example, specified in a protocol, or specified by the RAN device and sent to the first terminal device by using a system message.

In a possible design, when determining that the LCH ID meets the first preset rule, the RAN device may send the first data packet through the common RLC entity by using the following steps.

The RAN device determines, based on a correspondence between a plurality of pieces of preset service information (for example, single network slice selection assistance information (S-NSSAI)) and an LCH ID configuration rule, target service information corresponding to the first preset rule, the RAN device determines the common RLC entity based on the target service information, where the common RLC entity is configured to transmit a data packet of a target service indicated by the target service information, and the RAN device sends the first data packet through the common RLC entity.

According to this design, the first data packet and/or a first data transmission message that carries the first data packet may not need to carry the target service information, to reduce bit overheads of the first data packet and/or the first data transmission message.

In a possible design, the RAN device receives the first data packet from the first terminal device by using a first radio network temporary identifier RNTI of the first terminal device, after sending the first data packet through the common RLC entity, the RAN device receives a second data packet from the first terminal device by using the first RNTI, and the RAN device sends the second data packet through the common RLC entity.

According to this design, after sending the data packet through the common RLC entity, the RAN device stores the RNTI of the terminal device to which the data packet belongs. After receiving a data packet again by using the RNTI, the RAN device may directly determine to send the data packet through the common RLC entity. That is, the RAN device may determine, by using the RNTI, whether the data packet of the terminal device is sent through the common RLC entity. If the data packet of the terminal device is sent through the common RLC entity, the RAN device determines without decompressing the data packet to obtain the LCH ID or the first dedicated indicator, to improve data transmission efficiency of the RAN device.

In a possible design, the first data packet further includes an identifier of the first terminal device, after receiving the first data packet from the first terminal device, the RAN device stores a correspondence between the identifier of the first terminal device and the first RNTI, after sending the first data packet through the common RLC entity, the RAN device receives a successful authentication message from a centralized unit CU, and determines, based on the successful authentication message, that the identifier of the first terminal device is valid, and the RAN device determines, based on the stored correspondence between the identifier of the first terminal device and the first RNTI, that the first RNTI is valid.

According to this design, after receiving the data packet from the first terminal device for the first time, the RAN device stores the correspondence between the identifier of the first terminal device and the first RNTI of the first terminal device. In this way, after the data packet is sent to the CU, the CU performs identity authentication for the identifier of the first terminal device. When the CU sends the successful authentication message to the RAN device, and only the identifier of the first terminal device is valid, the RAN device may quickly determine that the first RNTI is valid. In this way, the RAN device may subsequently configure an uplink grant resource for the first terminal device by using the first RNTI, and continue to send the data packet of the first terminal device.

In a possible design, the first data packet further includes a first RLC sequence number SN, the second data packet further includes a second RLC SN, the first RLC sequence number (SN) is a positive integer, and the second RLC SN is a positive integer. After sending the first data packet through the common RLC entity, the RAN device updates a first RLC parameter of the common RLC entity to the first RLC SN. The RAN device may send the second data packet through the common RLC entity by using the following steps.

The RAN device determines whether the second RLC SN is equal to the first RLC SN+1. If the second RLC SN is equal to the first RLC SN+1, the RAN device sends the second data packet through the common RLC entity, and updates the first RLC parameter to the second RLC SN. If the second RLC SN is not equal to the first RLC SN+1, the RAN device stores the second data packet, and continues to receive the data packet from the first terminal device, and until it is determined that at least one target data packet is locally stored, the RAN device sends the target data packet and the second data packet through the common RLC entity, and updates the first RLC parameter to the second RLC SN, where a quantity of the at least one target data packet is equal to a difference between the second RLC SN and the first RLC SN+1, a target RLC SN included in each target data packet is a positive integer between the first RLC SN and the second RLC SN, and the target RLC SN included in the target data packet is different.

According to this design, the RAN device may sequentially send the data packet of the terminal device, to improve transmission efficiency of the data packet.

In a possible design, the RAN device receives a third data packet from a second terminal device, where the third data packet includes a third RLC SN, and then the RAN device may send the third data packet through the common RLC entity according to the method in the first aspect, and update a second RLC parameter of the common RLC entity to the third RLC SN.

According to this design, the common RLC entity may simultaneously have a plurality of RLC parameters. In this way, the RAN device may simultaneously send data packets of a plurality of terminal devices through the common RLC entity, to improve data transmission efficiency of the RAN device.

In a possible design, before sending the third data packet through the common RLC entity, the RAN device determines that a difference between the third RLC SN and the first RLC parameter is greater than a set threshold.

According to this design, the RAN device may determine, by determining whether the RLC SN exceeds the set threshold, whether to simultaneously receive data packets of two or more terminal devices, that is, whether to maintain a plurality of sets of RLC parameters. In this way, a value of an idle RLC SN may be effectively used, to improve transmission efficiency of the UE. In addition, the method may ensure that values of different RLC parameters of the common RLC entity differ greatly, to avoid an RLC SN conflict between different terminal devices when the common RLC entity transmits a packet.

In a possible design, the RAN device determines whether the LCH ID meets the first preset rule, determines a random access mode of the first terminal device, and determines a type of the first terminal device, and if determining that the random access mode of the first terminal device is contention-based random access, and/or determining that the first terminal device is a common terminal device, the RAN device determines whether the LCH ID meets the first preset rule.

According to this design, the RAN device may first determine, by determining the random access mode and the type of the terminal device, whether the data packet needs to be transmitted through the common RLC entity. When determining that a condition of transmitting the data packet through the common RLC entity is not met, the RAN device further determines, by determining whether the LCH ID in the received data packet meets the first preset rule or whether the data packet includes the first dedicated indicator, whether the data packet needs to be transmitted through the common RLC entity. In this way, in some cases, for example, when the UE in an RRC connected mode sends small data, the RAN device may no longer decapsulate the data packet, and obtains the LCH ID or the first dedicated indicator in the data packet, to determine to transmit the data packet through an RLC entity, so that a transmission manner of the data packet can be quickly and accurately determined, to improve transmission efficiency of the data packet. In conclusion, when the UE in the RRC connected mode sends the small data, the RAN device may quickly and accurately determine the transmission manner of the data packet, to improve transmission efficiency of the data packet. When the UE in an RRC idle mode or an RRC inactive mode needs to send small data, the UE directly generates the data packet that includes the LCH ID that meets the first preset rule or generates the data packet that includes the first dedicated indicator, and sends the data packet to the RAN device, so that the RAN device can send the data packet through the common RLC entity. In conclusion, the RAN device may no longer perform some processes such as RRC connection resume and RLC entity establishment for the foregoing small-data UE, to accelerate data transmission between the access network and the UE, so that data transmission efficiency between the access network and the UE can be improved. In addition, the RAN device may maintain the plurality of RLC parameters of the common RLC entity, to avoid an RLC SN conflict between different UEs, so that data transmission efficiency of the RAN device can be ensured.

In a possible design, if determining that the random access mode of the first terminal device is non-contention-based random access, and determining that the first terminal device is a terminal device for small data transmission, the RAN device sends the first data packet through the common RLC entity.

According to this design, the RAN device may determine, without decapsulating the data packet to obtain the LCH ID or the first dedicated indicator in the data packet, to transmit the data packet through the RLC entity, so that the transmission manner of the data packet can be quickly and accurately determined, to improve transmission efficiency of the data packet.

In a possible design, the RAN device may determine the random access mode of the first terminal device, and determine the type of the first terminal device by using the following steps.

The RAN device determines whether a first data transmission message that includes the first data packet includes a common control channel CCCH message, and if determining that the first data transmission message includes the CCCH message, the RAN device determines that the random access mode of the first terminal device is contention-based random access, and determines that the type of the first terminal device is the common terminal device, or if determining that the first data transmission message does not include the CCCH message, determining that the random access mode of the first terminal device is non-contention-based random access, the RAN device determines that the type of the first terminal device is the terminal device for small data transmission.

According to this design, when the first terminal device sends the first data packet in a two-step random access process, the RAN device may quickly determine the random access mode and the type of the first terminal device based on whether the first data transmission message includes the CCCH message.

In a possible design, the RAN device may determine the random access mode of the first terminal device by using the following steps.

The RAN device determines a target radio resource location occupied by the first data packet, and determines a stored dedicated radio resource location set, where the dedicated radio resource location set is allocated by the RAN device for a terminal device that accesses the RAN device in the random access mode of non-contention-based random access, and if determining that the dedicated radio resource location set includes the target radio resource location, the RAN device determines that the random access mode of the first terminal device is non-contention-based random access, or if determining that the dedicated radio resource location set does not include the target radio resource location, the RAN device determines that the random access mode of the first terminal device is contention-based random access.

According to this design, when the first terminal device sends the first data packet by using a conventional random access process, the RAN device may determine the random access mode of the first terminal device by using a target radio resource used by the first terminal device to send the first data packet.

In a possible design, the RAN device may determine the type of the first terminal device in but not limited to the following two manners.

Manner 1: The RAN device determines whether the LCH ID meets a second preset rule, and if determining that the LCH ID meets the second preset rule, the RAN device determines that the first terminal device is the terminal device for small data transmission, or if determining that the LCH ID does not meet the second preset rule, the RAN device determines that the first terminal device is the common terminal device.

Manner 2: The RAN device determines the first RNTI of the first terminal device that is used for receiving the first data packet, and determines a stored RNTI set of terminal devices for small data transmission, and if determining that the RNTI set includes the first RNTI, the RAN device determines that the first terminal device is the terminal device for small data transmission, or if determining that the RNTI set does not include the first RNTI, the RAN device determines that the first terminal device is the common terminal device.

According to this design, when the first terminal device sends the first data packet by using the conventional random access process, the RAN device may determine the type of the first terminal device by using the LCH ID in the first data packet or the first RNTI of the first terminal device.

In a possible design, the second preset rule may be one or a combination of the following, including the LCH ID is greater than a seventh preset value, the LCH ID is less than an eighth preset value, the LCH ID is between a ninth preset value and a tenth preset value, the LCH ID is greater than an eleventh preset value or less than a twelfth preset value, where the eleventh preset value is greater than the twelfth preset value, and a quantity of bits of the LCH ID is equal to a second set value, or set to another random bit string other than the dedicated LCH ID value (including the first preset rule).h In addition, the second preset rule may be predefined. For example, the second preset rule may be specified in the protocol, or specified by the base station and notified to the first terminal device by using the system message.

According to a second aspect, an embodiment of this application provides a RAN device, including units configured to perform the steps according to the first aspect.

According to a third aspect, an embodiment of this application provides a RAN device, including at least one processing element and at least one storage element. The at least one storage element is configured to store a program and data, and the at least one processing element is configured to perform the method according to the first aspect of this application.

According to a fourth aspect, an embodiment of this application provides a network device (in other words, a base station), including a DU and a CU, where the DU has a function of performing the method according to the first aspect of this application.

According to a fifth aspect, an embodiment of this application provides a communication system, including a DU and a CU, where the DU has a function of performing the method according to the first aspect of this application.

According to a sixth aspect, an embodiment of this application provides a communication system, including a base station and a terminal device, where the base station includes a DU and a CU, and the DU has a function of performing the method according to the first aspect of this application.

According to a seventh aspect, an embodiment of this application further provides a computer program. When the computer program is run on a computer, the computer is enabled to perform the method according to the first aspect.

According to an eighth aspect, an embodiment of this application further provides a computer-readable storage medium, where the computer-readable storage medium stores a computer program, and when the computer program is executed by a computer, the computer is enabled to perform the method according to the first aspect.

According to a ninth aspect, an embodiment of this application further provides a chip, where the chip is configured to read a computer program stored in a memory, to perform the method according to the first aspect.

According to a tenth aspect, an embodiment of this application further provides a chip system, where chip system includes a processor, configured to support a computer apparatus in implementing the method according to the first aspect. In a possible design, the chip system further includes a memory, and the memory is configured to store a program and data that are necessary for the computer apparatus. The chip system may include a chip, or may include a chip and another discrete component.

BRIEF DESCRIPTION OF THE DRAWINGS

FIG. 6 is a schematic diagram of a structure of a data packet according to an embodiment of this application;

DETAILED DESCRIPTION OF ILLUSTRATIVE EMBODIMENTS

Figure 1:
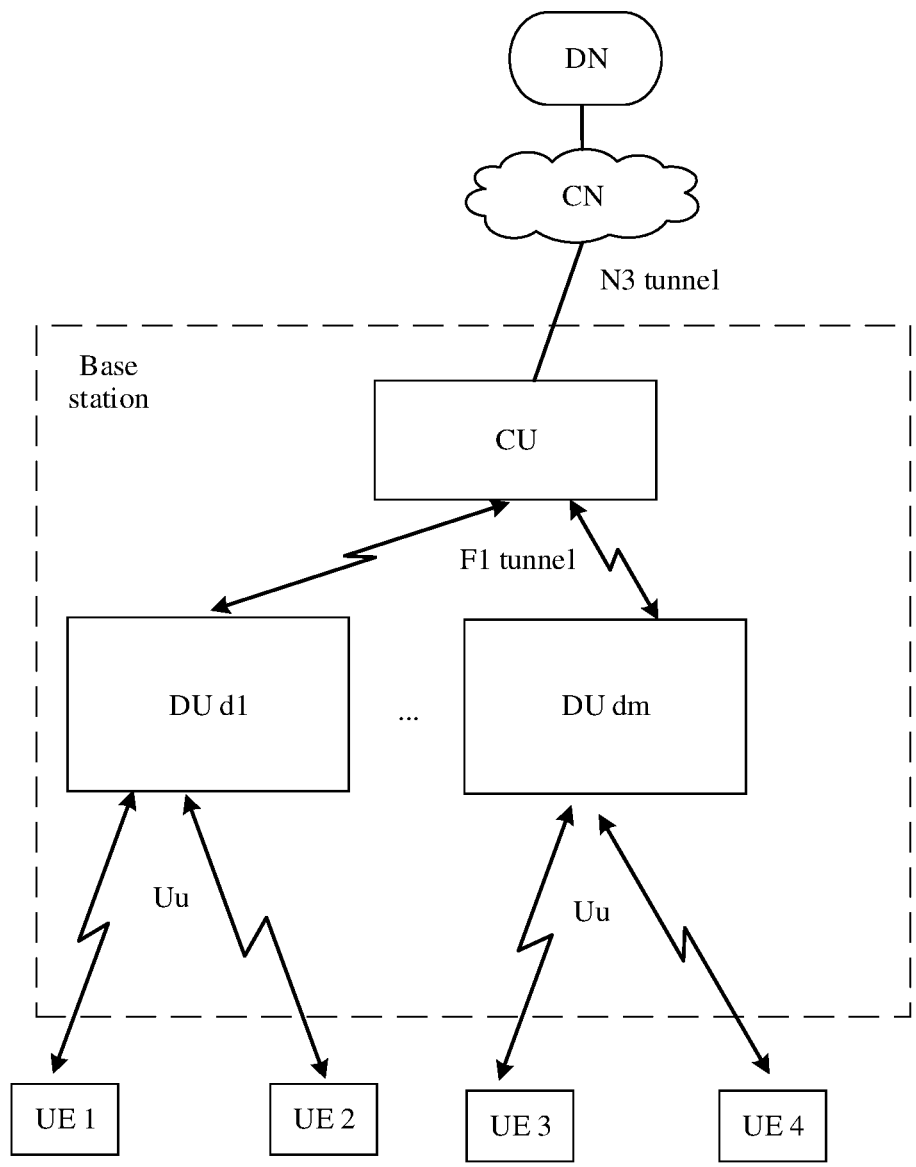
FIG. 1 is a diagram of an architecture of a communication system according to an embodiment of this application.

This application provides a data transmission method applied to an access network and a device, to simplify data transmission between the access network and a terminal device. The method and the device are based on a same technical concept. Because a problem-resolving principle of the method is similar to a problem-resolving principle of the device, mutual reference may be made to implementations of the method and the device, and no repeated description is provided.

In the solutions provided in embodiments of this application, after receiving a data packet of the terminal device, a RAN device determines whether an LCH ID included in the data packet meets a first preset rule. If the LCH ID included in the data packet meets the first preset rule, the RAN device sends a first data packet through a common RLC entity. In this way, in some scenarios, for example, when the terminal device in an RRC idle mode or an RRC inactive mode needs to send small data, the terminal device generates a data packet that includes an LCH ID that meets the first preset rule, and sends the data packet to the RAN device. After determining that the LCH ID in the received data packet meets the first preset rule, the RAN device may directly send the data packet through the common RLC entity. According to this solution, in some scenarios, the DU may no longer perform some processes such as RRC connection resume and RLC entity establishment for the terminal device, to accelerate data transmission between the access network and the terminal device, so that data transmission efficiency between the access network and the terminal device can be improved.

In the following, some terms in this application are described, to help a person skilled in the art have a better understanding.

(1) A terminal device is a device that provides a voice and/or data connectivity for a user. The terminal device may also be referred to as user equipment (UE), a mobile station (MS), a mobile terminal (MT), or the like. For example, the terminal device may be a handheld device or a vehicle-mounted device that has a wireless connection function. Currently, some terminal devices are, for example, a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, or various smart meters (smart water meter, smart electricity meter, or smart gas meter). For ease of description, in subsequent description and figures of this application, the terminal device may be referred to as UE for short.

It should be noted that in embodiments of this application, based on transmitted data volumes of the terminal devices, the terminal devices may be classified into a terminal device for small data transmission (small-data UE) and a common terminal device (common UE). For example, small-data UEs may be various smart meters, wireless terminals in industrial control, or the like. The common UE is a terminal device other than the small-data UE.

(2) A base station is a network device from which a UE accesses a wireless network. The network device is a node in a radio access network, and may also be referred to as a network device or a radio access network (RAN) node (or device). Currently, some examples of a network device include a gNB, a transmission reception point (TRP), an evolved NodeB (eNB), a radio network controller (RNC), a NodeB (NB), a base station controller (base station controller, BSC), a base transceiver station (BTS), a home base station (for example, a home evolved NodeB or a home NodeB, HNB), a baseband unit (base band unit, BBU), and a wireless fidelity (Wi-Fi) access point (AP).

It should be noted that, in embodiments of this application, the base station is deployed in a distributed manner. To be specific, the base station includes a CU and at least one DU. In this network structure, protocol layer functions of the base station need to be separated. Some protocol layer functions are deployed in the CU for centralized control, and some or all of the remaining protocol layer functions are distributed in the DUs. The CU controls the DUs in the centralized manner. The CU communicates with the DU through an F1 tunnel (an F1 interface). In some implementations, the CU and the DU may be independent products or nodes. In some other implementations, the CU and the DU are integrated into the base station.

(3) An RLC entity is generated by a (DU in the) base station to implement an RLC function, and is responsible for error correction and flow control. The RLC entity can provide radio link control between a UE and the base station, and provide an end-to-end data transmission service for a higher layer.

In embodiments of this application, for ease of distinguishing, RLC entities in the base station are classified into two types: a dedicated RLC entity and a common RLC entity.

The dedicated RLC entity is generated by the base station for a DRB of a single UE, and the dedicated RLC entity has a capability of transmitting a data packet of the UE only. When the DRB of the UE is released, the dedicated RLC entity of the UE is also released. However, the common RLC entity is not generated by the base station for the DRB of the single UE, and the common RLC entity has a capability of transmitting data packets of a plurality of UEs. Generally, the common RLC entity is not set up/released with setup/release of a DRB of a UE.

In addition, it should be further noted that each RLC entity maintains a corresponding RLC parameter, to be specific, an RLC sequence number (SN) used to sequentially transmit the data packets of the UE. Generally, there is one RLC parameter for the dedicated RLC entity. In embodiments of this application, a quantity of RLC parameters of the common RLC entity is not limited (certainly, a maximum value of the quantity of RLC parameters may alternatively be set). At any moment, the quantity of RLC parameters of the common RLC entity may be a quantity of UEs that send data packets through the common RLC entity.

(4) "A plurality of" refers to two or more than two.

(5) "At least one" refers to one or more.

(6) The term "and/or" describes an association relationship between associated objects and indicates that three relationships may exist. For example, A and/or B may represent the following three cases: Only A exists, both A and B exist, and only B exists. The character "/" generally indicates an "or" relationship between the associated objects.

In addition, it should be understood that in description of this application, terms such as "first" and "second" are only used for distinguishing and description, but should not be understood as indicating or implying relative importance, or should not be understood as indicating or implying a sequence.

The following describes in detail embodiments of this application with reference to accompanying drawings.

FIG. 1 shows a structure of a communication system used in a data transmission method according to an embodiment of this application. Refer to FIG. 1. The communication system includes a UE, an access network (AN), and a core network (CN). The following describes functions of each device in detail with reference to FIG. 1.

The access network is responsible for providing a radio access-related service for the UE, and implementing a radio physical layer function, resource scheduling and radio resource management, quality of service (QoS) management, radio access control, and a mobility management (for example, cell reselection and handover) function. The access network may implement the foregoing functions through a base station. In embodiments of this application, the base station or a device/module included the base station may also be referred to as a RAN device. For example, a DU included in the base station may be referred to as a RAN device.

The UE is a device that accesses a data network through a cell managed by the base station.

The CN is responsible for connecting the UE to different data networks (DN) based on a call request or a service request sent by the UE through the base station, and performing services such as charging, mobility management, and session management.

Optionally, based on logical function division, the core network may include two types of core network devices: a user plane network element and a control plane network element. The user plane network element may also be referred to as a user plane function (UPF) entity. The user plane network element is an anchor for maintaining service continuity of the UE, and is responsible for forwarding user plane data of the UE. The control plane network element may also be referred to as a control plane function (CPF) entity. The control plane network element is a network element that has a control management function and that is responsible for implementing session management, access and mobility management, policy control, and the like in the core network. The control plane network element may include an access and mobility management function (AMF) entity, a session management function (SMF) entity, a policy control function (PCF) entity, or another functional entity formed after any plurality of the foregoing network elements are combined.

As shown in the figure, in this application, the base station in the communication system is deployed in a distributed manner. To be specific, protocol layer functions of the base station are separated and deployed. Functions of an SDAP sublayer and a PDCP sublayer of the base station are deployed in a CU for centralized control, and functions of a MAC sublayer, an RLC sublayer, and a physical layer (PHY) of the base station are deployed in a DU. The CU may control at least one DU in a centralized manner.

As shown in the figure, the CU in the base station communicate with the CN by establishing an N3 tunnel. The CU communicates with each DU by establishing an F1 tunnel. The DU communicates with each UE through a Uu interface.

It should be noted that the communication system shown in FIG. 1 may be applied to a plurality of communication scenarios, for example, a $5^{th}$ generation (a $5^{th}$ Generation, 5G) communication system, a future $6^{th}$ generation communication system and another evolved communication system, a long term evolution (long term evolution, LTE) communication system, a 4.5G communication system, a vehicle to everything (vehicle to everything, V2X), and a long term evolution-vehicle (LTE-vehicle, LTE-V), vehicle to vehicle (vehicle to vehicle, V2V), Internet of Vehicles, machine type communication (machine type communication, MTC), Internet of Things (Internet of Things, IoT), long term evolution-machine to machine (LTE-machine to machine, LTE-M), or machine to machine (machine to machine, M2M).

Currently, RRC connection modes may be classified into three types: an RRC connected (connected) mode, an RRC idle (idle) mode, and an RRC inactive (inactive) mode. Refer to (a) to (d) in FIG. 2A, FIG. 2B, FIG. 2C, and FIG. 2D. The following separately describes a mode of a base station and an operation performed by the base station in each RRC connection mode and in a mode switching process.

In the communication system provided in this application, after a UE accesses a base station, to transmit data of the UE, the base station needs to establish a DRB of the UE. Each DRB corresponds to three function entities: an SDAP entity, a PDCP entity, and an RLC entity. Therefore, the base station needs to perform the following processes: The CU establishes an RRC connection of the UE, establishes a dedicated N3 tunnel between the CU and a UPF in a CN, establishes an F1 tunnel between the CU and a DU, and establishes a dedicated PDCP entity and SDAP entity inside the CU, and the DU establishes an RLC entity inside the DU. After the foregoing processes are completed, the UE enters the RRC connected mode, and the UE may transmit data through the DU and the CU in the base station. Refer to (a) in FIG. 2A.

When the UE enters the RRC idle mode from the RRC connected mode, the DRB of the UE is released. Certainly, the RRC connection, the N3 tunnel, and the F1 tunnel, the PDCP entity and the SDAP entity in the CU, and the RLC entity in the DU that are established for establishing the DRB of the UE are all released. Refer to (b) in FIG. 2B. Therefore, when the UE enters the RRC connected mode from the RRC idle mode, the DRB of the UE needs to be re-established. That is, the foregoing processes are performed again.

When the UE enters the RRC inactive mode from the RRC connected mode, the N3 tunnel, the PDCP entity, and the SDAP entity that correspond to the DRB of the UE are maintained, and the F1 tunnel and the RLC entity are released. Refer to (c) in FIG. 2C. Therefore, when the UE enters the RRC connected mode from the RRC inactive mode, only RRC connection resume and re-establishment of the RLC entity and the F1 tunnel need to be performed.

Therefore, in some scenarios, for example, in a scenario in which a small-data UE exists in a communication system, to reduce a data transmission delay of the small-data UE, the RRC inactive mode may be introduced. When the small-data UE has no data transmission requirement, the small-data UE may enter the RRC inactive mode from the RRC connected mode. When the small-data UE has the data transmission requirement, the small-data UE may quickly enter the RRC connected mode for data transmission.

However, when there is a relatively large quantity of small-data UEs in the communication system, even if the RRC inactive mode technology is introduced, the base station still needs to perform processes such as the RRC connection resume and re-establishment of the RLC entity and the F1 tunnel for each small-data UE. Therefore, processing processes of the CU and the DU in the base station are still increased, thereby leading to excessive consumption of signaling resources and transmission resources.

To simplify data transmission between the CU and the DU in the base station and the small-data UE, a concept of a common RLC entity is further introduced in embodiments of this application. In this way, when the small-data UE needs to transmit small data, the small-data UE may generate a data packet including the small data and send the data packet to the DU in the base station, and the DU may directly transmit the received data packet to the CU through a common RLC entity in the DU and a common F1 tunnel. This may greatly simplify a data transmission process of the base station.

Figure 2A:
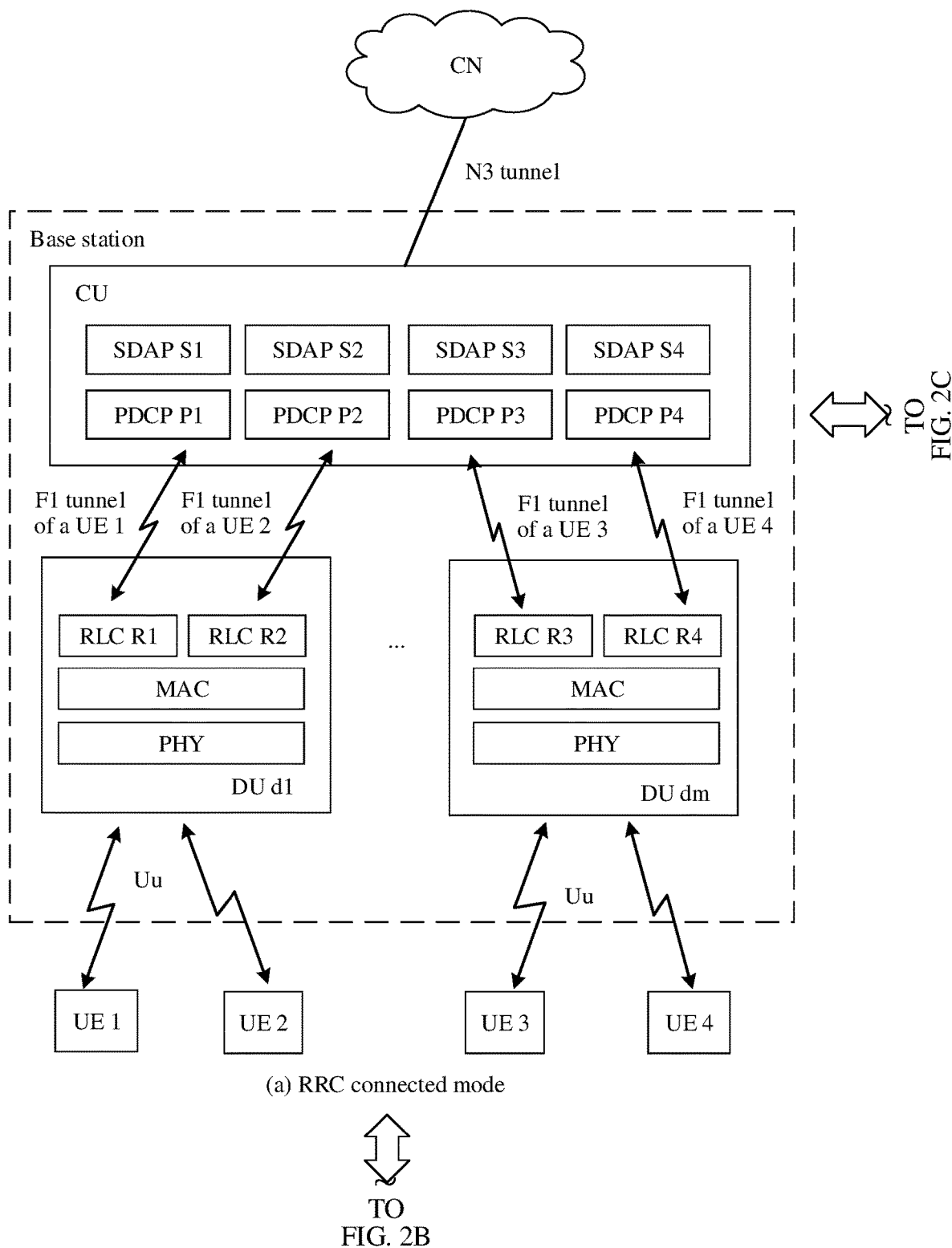
FIG. 2A, FIG. 2B, FIG. 2C, and FIG. 2D are a schematic diagram of modes of a base station in different RRC modes according to an embodiment of this application.
Figure 2B:
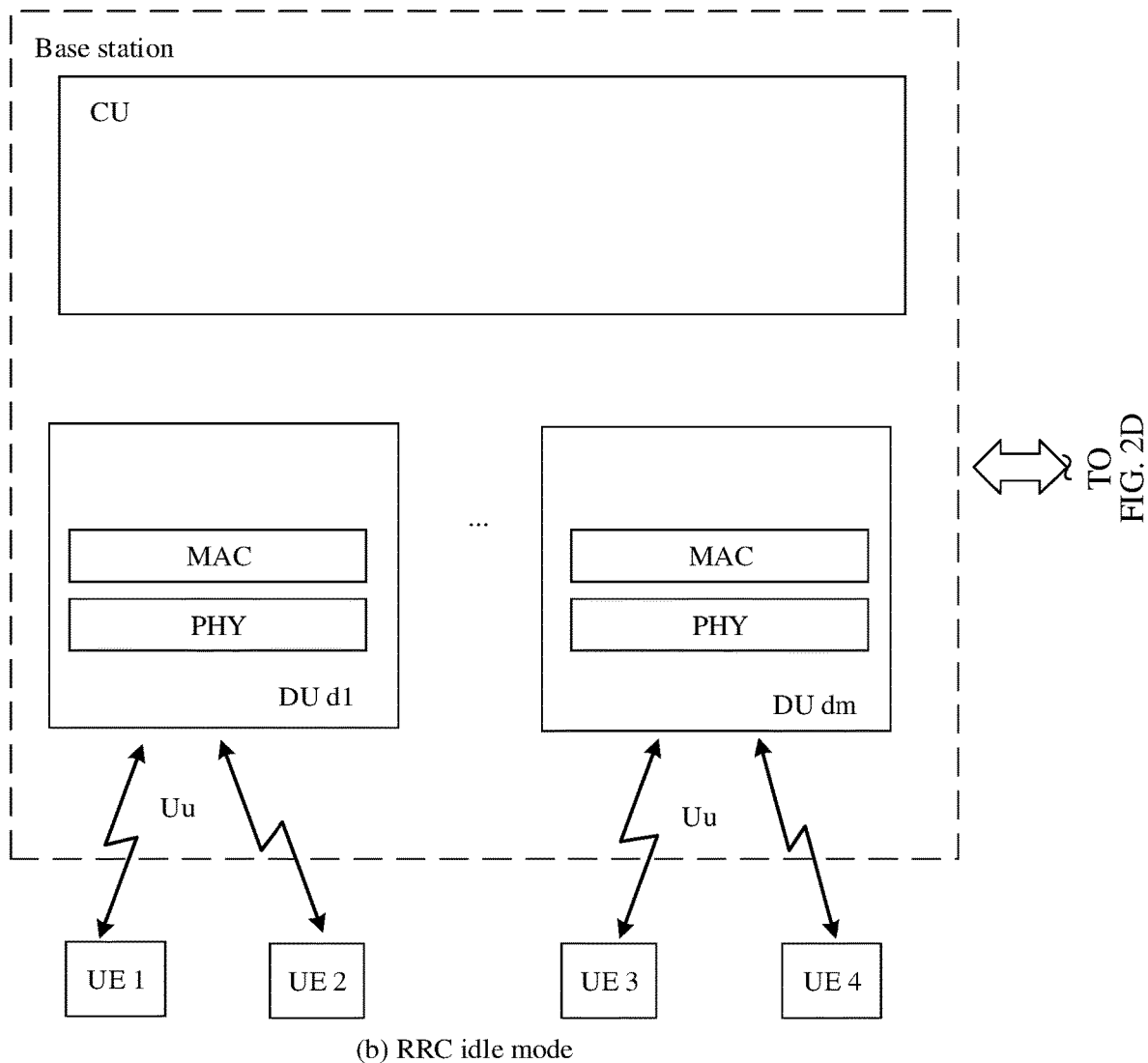
Figure 2C:
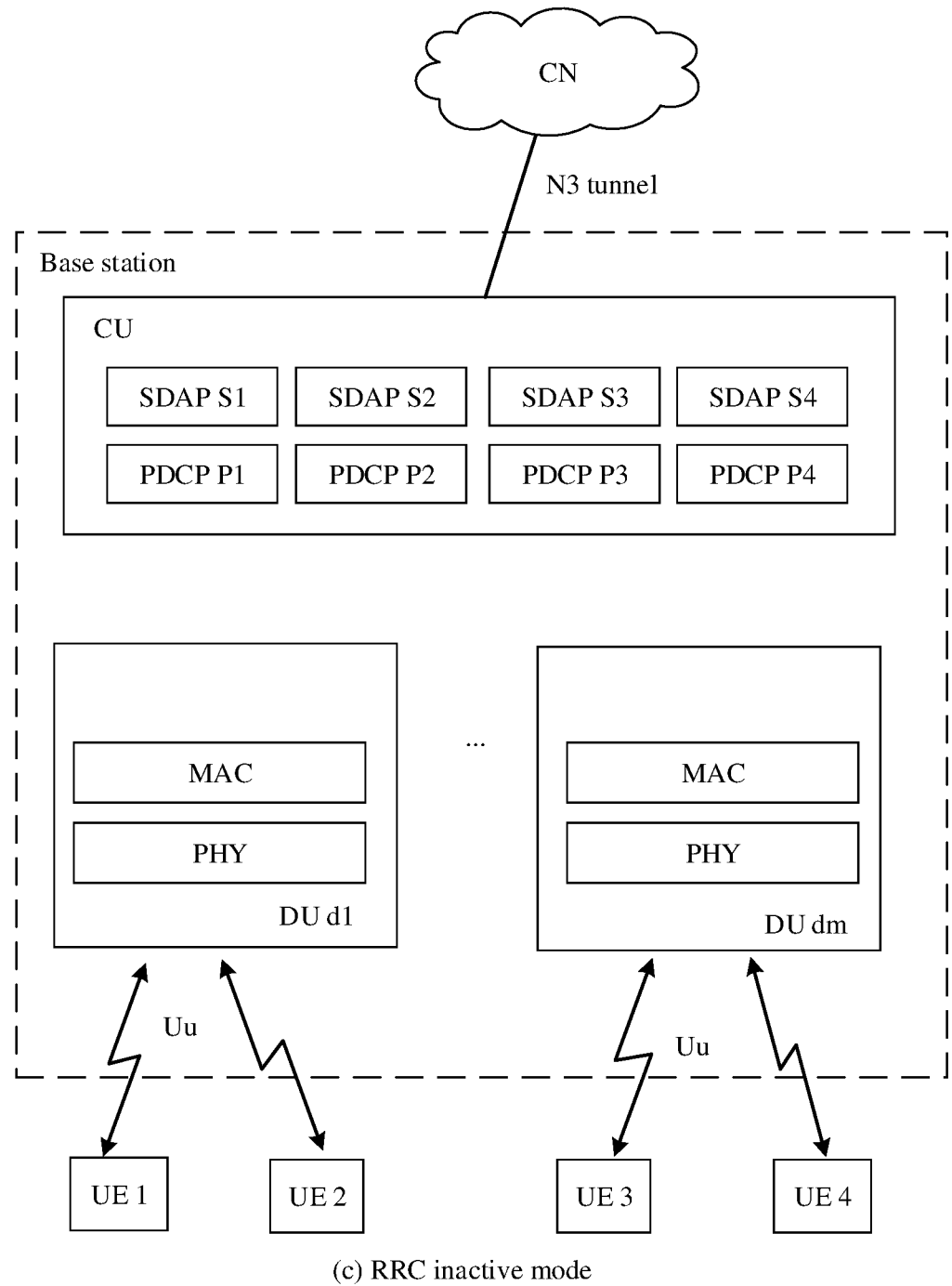
Figure 2D:
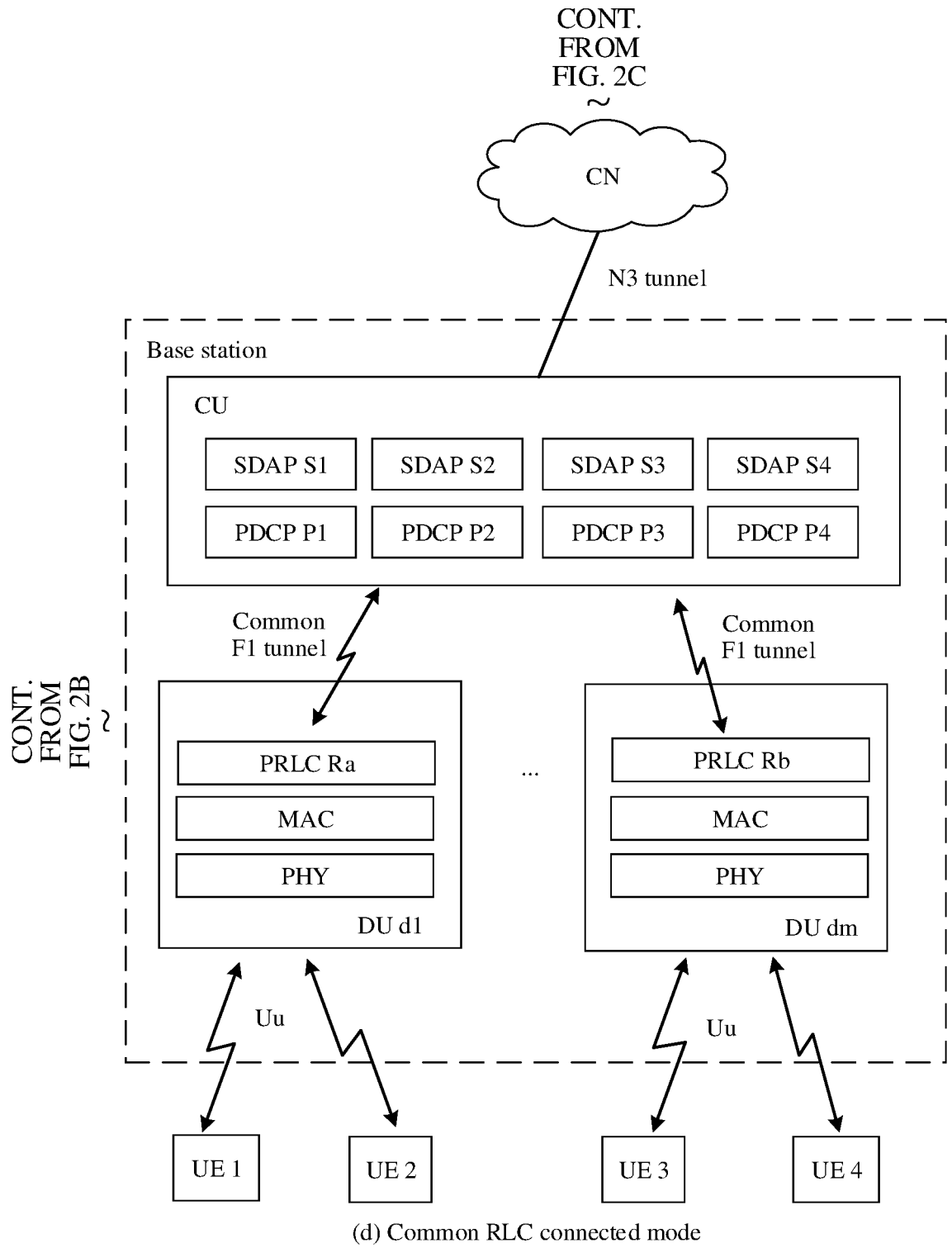

Refer to (d) in FIG. 2D. Each DU may transmit data of a plurality of accessed UEs through the common RLC entity in the DU, and transmit the data of the plurality of UEs to the CU through the common F1 tunnel between the DU and the CU. In embodiments of this application, a mode in which there is the common RLC entity in the DU may be referred to as a common RLC connected mode.

For ease of drawing, the SDAP entity, the PDCP entity, and the RLC entity in each figure in FIG. 2A, FIG. 2B, FIG. 2C, and FIG. 2D are respectively referred to as SDAP, PDCP, and RLC for short.

Figure 3A:
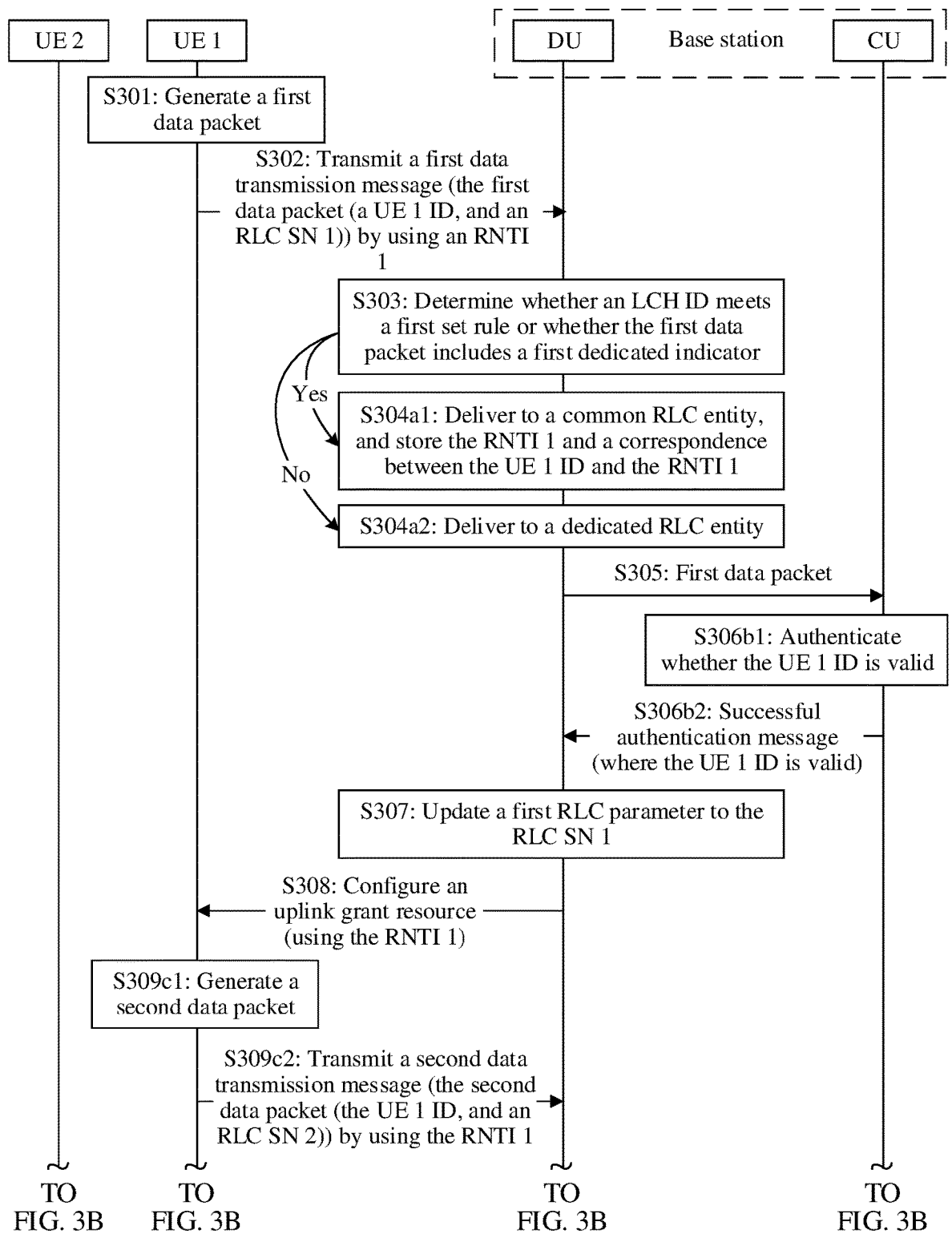
FIG. 3A and FIG. 3B are a flowchart of a data transmission method according to an embodiment of this application.
Figure 3B:
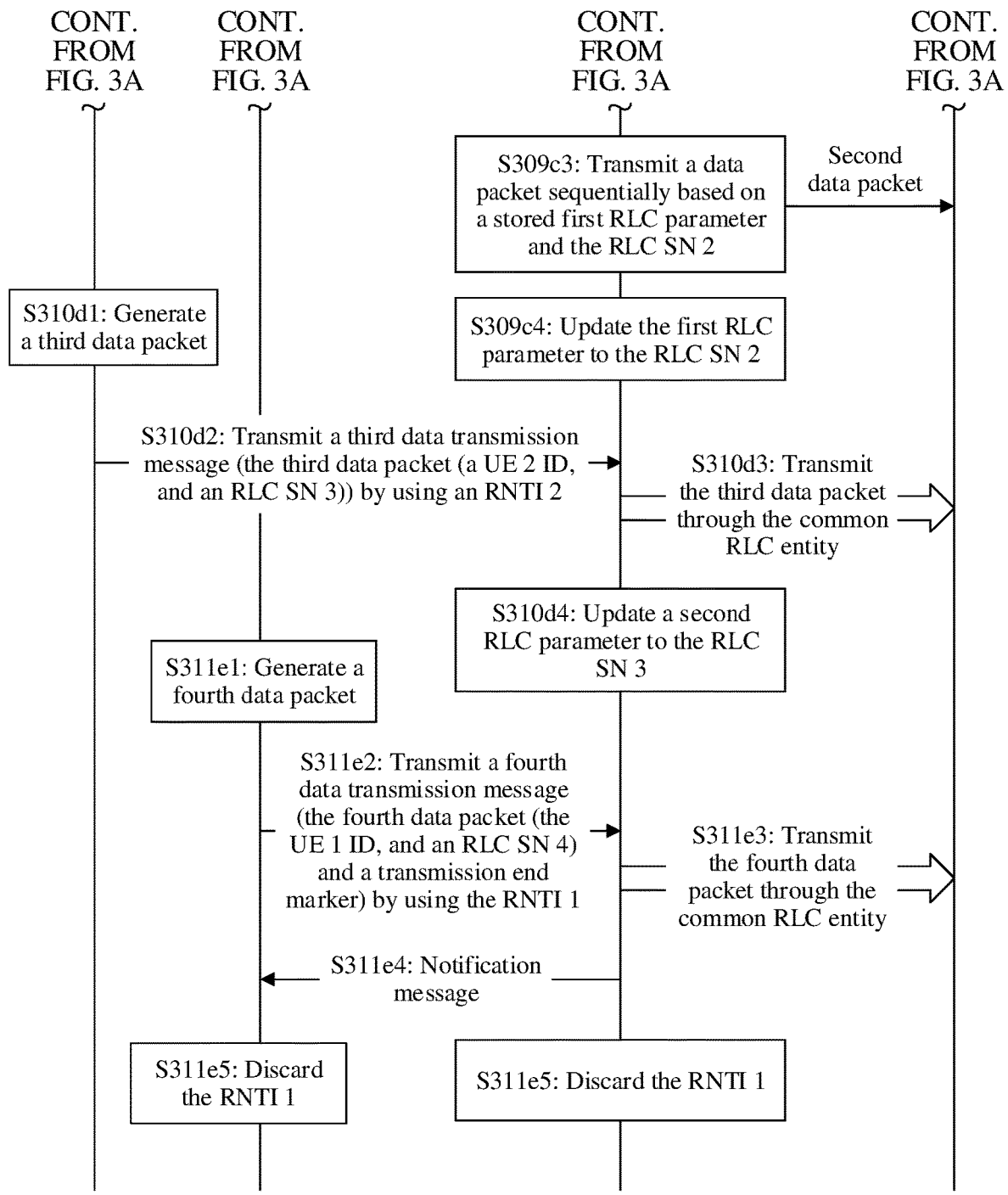

To implement data transmission in the common RLC connected mode shown in (d) in FIG. 2D, an embodiment of this application provides a data transmission method applied to an access network. Refer to FIG. 3A and FIG. 3B. The method may be applied to the access network in the communication system shown in FIG. 1. In this embodiment of this application, a base station is deployed based on the distributed structure shown in FIG. 1. The following uses an example in which a RAN device included in the base station includes a CU module and a DU module for description. The DU includes a common RLC entity, and the common RLC entity can transmit data packets of a plurality of UEs. It should be noted that a quantity of UEs is not limited in this embodiment of this application. In FIG. 3A and FIG. 3B, only a UE 1 and a UE 2 are used as examples for description.

The following describes in detail the data transmission method provided in this embodiment of this application with reference to a flowchart of the data transmission method shown in FIG. 3A and FIG. 3B.

S301: When having a data transmission requirement, the UE 1 generates a first data packet based on to-be-transmitted data, where the first data packet includes a logical channel identifier (LCH ID).

When the UE 1 determines that the to-be-transmitted data is small data (for example, a data volume is less than a set data volume threshold), when a mode of the UE 1 is an RRC idle mode or an inactive mode, or when the to-be-transmitted data generated by the UE 1 is target service information (for example, a target service information identifier) of a performed target service, the UE 1 sets the LCH ID in the first data packet according to a first preset rule, or the UE 1 adds a first dedicated indicator to the first data packet. An LCH ID that meets the first preset rule is used to notify the DU to send a data packet that includes the LCH ID through the common RLC entity, or notify that a UE that sends the data packet that includes the LCH ID is a small-data UE. The first dedicated indicator is used to indicate the DU to send, through the common RLC entity, a data packet that includes the first dedicated indicator.

For example, the first preset rule may be one or a combination of the following, including the LCH ID is greater than a first preset value, the LCH ID is less than a second preset value, the LCH ID is between a third preset value and a fourth preset value, the LCH ID is greater than a fifth preset value or less than a sixth preset value, where the fifth preset value is greater than the sixth preset value, and a quantity of bits of the LCH ID is equal to a first set value, or is set to a random bit string other than a dedicated LCH ID value.

The first dedicated indicator may be a bit string with a preset value, for example, represented by "1" or "11".

The first data packet includes an identifier of the UE 1 (UE 1 ID) and a randomly generated RLC SN (RLC SN 1). In an implementation, the first data packet may be a MAC service data unit SDU (SDU). The RLC SN may identify a generation sequence of data packets. After randomly generating the RLC SN 1, the UE 1 may generate an RLC SN of a subsequent data packet incrementally based on the RLC SN 1. For example, a value of the RLC SN 1 may be 723.

In this embodiment of this application, the first preset rule or the first dedicated indicator may be predefined. Optionally, the first preset rule or the first dedicated indicator may be specified in a protocol, or may be specified by the base station and notified to the UE 1 by using a system message (for example, a system information block (system information block, SIB)). It should be noted that, when the first preset rule or the first dedicated indicator is specified in the protocol, values of first preset rules or first dedicated indicators used by UEs in all cells are the same, and when the first preset rule or the first dedicated indicator is specified by the base station, values of first preset rules or first dedicated indicators used by UEs in different cells may be different.

It should be noted that, in an implementation in which the UE 1 sets the LCH ID in the first data packet based on the target service information of the performed target service according to the first preset rule, for example, the target service information may be a network slice identifier, for example, single network slice selection assistance information (S-NSSAI). The base station (DU) may send a correspondence between at least one piece of service information and an LCH ID configuration rule to the UE 1 by using the system message or RRC dedicated signaling. In this way, when performing the target service and generating the to-be-transmitted data, the UE 1 may directly configure the LCH ID in the data packet according to an LCH ID configuration rule corresponding to the target service information of the target service. According to this manner, the first data packet generated by the UE 1 and/or a first data transmission message that carries the first data packet may not need to carry the target service information (S-NSSAI), to reduce bit overheads of the first data packet and/or the first data transmission message.

S302: The UE 1 may send the first data transmission message to the DU in the accessed base station, where the first data transmission message includes the first data packet, and the first data packet is scrambled by using an RNTI (which is referred to as an RNTI 1 in the following) of the UE 1. The DU receives the first data transmission message from the UE 1, and descrambles the first data transmission message by using the RNTI 1, to obtain the first data packet. It should be noted that, the UE 1 may send the first data transmission message by using a random access process.

S303: The DU obtains the first data packet, then identifies the UE 1 ID and the RLC SN 1 in the first data packet, and determines whether the LCH ID in the first data packet meets the first preset rule, or determines whether the first data packet includes the first dedicated indicator. If the LCH ID in the first data packet meets the first preset rule or the first data packet includes the first dedicated indicator, the DU performs S304a1, or if the LCH ID in the first data packet does not meet the first preset rule or the first data packet includes the first dedicated indicator, the DU performs S304a2.

By determining whether the LCH ID in the first data packet meets the first preset rule or whether the first data packet includes the first dedicated indicator, the DU may quickly determine whether to deliver the first data packet to the common RLC entity, and the common RLC entity transmits the received data packet to the CU.

In an implementation, when determining that the LCH ID meets the first preset rule, the DU may determine, by using the following steps, to send the first data packet through the common RLC entity.

The DU determines, based on a correspondence between a plurality of pieces of service information and the LCH ID configuration rule, target service information corresponding to the first preset rule.

The DU determines the common RLC entity based on the target service information, where the common RLC entity is configured to transmit a data packet of the target service indicated by the target service information (in other words, there is a correspondence between the target service information and the common RLC entity). The DU also stores the correspondence between the plurality of pieces of service information and RLC entities. In this way, the DU may determine the common RLC entity based on the target service information.

S304a1: The DU delivers the first data packet to the common RLC entity, stores the RNTI 1 that is used for receiving the first data packet, and stores a correspondence between the UE 1 ID and the RNTI 1.

The DU stores the RNTI 1 that is used for receiving a first packet. In this way, when using the RNTI 1 again to receive other data packets, the DU may directly deliver these data packets to the common RLC entity without a need to decapsulate these data packets, to improve data transmission efficiency.

In addition, the DU may further store the correspondence between the UE 1 ID and the RNTI 1. In this way, after receiving a successful authentication message that is sent by the CU and that indicates that the UE 1 ID is valid, the DU may directly determine that the RNTI 1 corresponding to the UE 1 ID is valid, so that the RNTI 1 can be subsequently used to configure an uplink grant resource for the UE 1, and the common RLC entity is further configured to transmit the data packet of the UE 1 that is received by using the RNTI 1.

S304a2: The DU delivers the first data packet to a dedicated RLC entity of the UE 1, where the dedicated RLC entity is established by the DU for the UE 1.

Optionally, when the DU performs S304a2, if the dedicated RLC entity of the UE 1 is not established, the DU needs to establish the dedicated RLC entity of the UE 1 first, and then performs S304a2.

S305: The DU sends first data packet to the CU in the base station through the common RLC entity or the dedicated RLC entity of the UE 1.

After receiving the first data packet, the CU performs identity authentication on the UE 1 by using the following two steps.

S306b1: After receiving the first data packet, the CU obtains the UE 1 ID from the first data packet, and authenticates whether the UE 1 ID is valid.

S306b2: After authenticating that the UE 1 ID is valid, the CU sends the successful authentication message to the DU.

S307: After receiving the successful authentication message, the DU determines that the UE 1 ID is valid, determines, based on the correspondence between the UE 1 ID and the RNTI 1, that the RNTI 1 is valid, and updates a first RLC parameter of the common RLC entity to the RLC SN 1.

S308: The DU configures the uplink grant resource for the UE 1 by using the RNTI 1.

Subsequently, the UE 1 may continue to send a data packet based on the uplink grant resource configured by the DU. The following uses transmission of a second data packet of the UE 1 as an example for description. Refer to steps S309c1 to S309c4 in FIG. 3A and FIG. 3B.

S309c1: The UE 1 generates the second data packet based on to-be-transmitted data, where the second data packet also includes an LCH ID.

Similar to the first data packet generated by the UE 1 in S301, the second data packet also includes the UE 1 ID and an RLC SN 2. The RLC SN 2 is generated by the UE 1 incrementally based on the RLC SN 1. To be specific, from a perspective of the sender UE 1, the UE 1 sequentially sends the data packets based on the sequence numbers of the RLC SNs.

For example, the second data packet is the $1^{st}$ data packet generated after the UE 1 generates the first data packet, and in this case, RLC SN 2=RLC SN 1+1. For another example, the second data packet is the $i^{th}$ data packet generated after the UE 1 generates the first data packet, and in this case, RLC SN 2=RLC SN 1+i, where i is an integer greater than 1.

Optionally, the LCH ID in the second data packet alternatively meets the first preset rule, or the second data packet may alternatively include the first dedicated indicator.

S309c2: The UE 1 may send a second data transmission message to the DU, where the second data transmission message includes the second data packet, and the second data packet is scrambled by using the RNTI 1. The DU receives the second data transmission message from the UE 1, and descrambles the second data transmission message by using the RNTI 1, to obtain the second data packet.

S309c3: After the DU obtains the second data packet, because the DU descrambles the second data packet by using the previously stored and authenticated RNTI 1, the DU may determine to deliver the second data packet to the common RLC entity for transmission. Certainly, the DU may further determine, by determining whether the LCH ID in the second data packet meets the first preset rule or whether the second data packet includes the first dedicated indicator, whether to deliver the second data packet to the common RLC entity for transmission. When determining to deliver the second data packet to the RLC entity, the DU sequentially transmits the data packet based on the stored first RLC parameter and the RLC SN 2 in the second data packet. It is known that, although the sender UE 1 sequentially sends data packets based on the RLC SNs, due to uncertainty of an air interface, a sequence of receiving the data packets by a receiver may not be the sequence of the RLC SNs. Therefore, to improve transmission efficiency of data packets, in this embodiment of this application, the DU may sequentially transmit the data packets based on the RLC SN and the RLC parameter in the data packet.

In an implementation, the DU may sequentially transmit the data packet by using the following steps.

The DU determines whether a value of the RLC SN 2 is equal to a sum of a value of the stored first RLC parameter (the RLC SN 1) and 1.

If the value of the RLC SN 2 is equal to the sum of the value of the stored first RLC parameter (the RLC SN 1) and 1, the DU sends the second data packet through the common RLC entity.

If the value of the RLC SN 2 is not equal to the sum of the value of the stored first RLC parameter (the RLC SN 1) and 1, the DU stores the second data packet, and continues to receive a data packet from the UE 1, and until it is determined that at least one target data packet is locally stored, the DU sends the at least one target data packet and the second data packet through the common RLC entity, where a quantity of the at least one target data packet is equal to a difference between the RLC SN 2 and the RLC SN 1+1, a target RLC SN included in each target data packet is a positive integer between the RLC SN 1 and the RLC SN 2, and the target RLC SN included in the target data packet is different. That is, the UE 1 sends the at least one target data packet between sending of the first data packet and sending of the second data packet.

S309c4: After sequentially transmitting the data packet, the DU updates the first RLC parameter to the RLC SN 2.

According to an existing protocol, the RLC entity (the dedicated RLC entity) in the base station has only one RLC parameter. To be specific, a data packet of a DRB of only one UE can be transmitted at a time. However, in this embodiment of this application, the common RLC entity has a capability of transmitting the data packets of the plurality of UEs. To enable the DU to simultaneously transmit the data packets of the plurality of UEs and avoid a case in which transmission efficiency of the DU is reduced due to an RLC SN conflict between different UEs, in this embodiment of this application, the common RLC entity may have a plurality of RLC parameters. To be specific, the DU may maintain the plurality of RLC parameters of the common RLC entity for a plurality of UEs whose data packets are to be transmitted. By using this method, data transmission efficiency of the common RLC entity in the DU may be improved. The following uses the UE 2 as an example to describe in detail, by using S310d1 to S310d4, that the DU maintains the plurality of RLC parameters. In addition, it should be noted that there is no time relationship between the process and the foregoing process of S301 to S309c4, and time periods in which the DU transmits the data packets of the UE 1 and the UE 2 overlap to some extent.

S310d1: When having a data transmission requirement, the UE 2 generates a third data packet based on to-be-transmitted data, where the third data packet includes an LCH ID. Similar to that the UE 1 generates the first data packet, the UE 2 may also, based on that the to-be-transmitted data is small data, or a mode of the UE 2 is the RRC idle mode or the inactive mode, or based on that the generated to-be-transmitted data is the target service information of the performed target service, set the LCH ID in the third data packet according to the first preset rule, or the UE 2 adds the first dedicated indicator in the third data packet.

Similar to the first data packet generated by the UE 1 in S301, the third data packet includes an identifier of the UE 2 (UE 2 ID) and a randomly generated RLC SN (RLC SN 3). For example, a value of the RLC SN 3 may be 942.

S310d2: The UE 2 may send a third data transmission message to the DU in the accessed base station, where the third data transmission message includes the third data packet, and the third data packet is scrambled by using an RNTI of the UE 2 (which is referred to as an RNTI 2 in the following). The DU receives the third data transmission message from the UE 2, and descrambles the third data transmission message by using the RNTI 2, to obtain the third data packet. The UE 2 may also send the third data transmission message by using the random access process.

S310d3: The DU may transmit the third data packet through the common RLC entity with reference to the data packet transmission process in S303 to S306b2. For a specific process, refer to the description of the foregoing corresponding steps. Details are not described herein again.

Optionally, to avoid an RLC SN conflict between different UEs in a process of transmitting the data packets by the common RLC entity, before sending the third data packet through the common RLC entity, the DU may first determine a difference between the RLC SN 3 in the third data packet and the first RLC parameter. If the difference is greater than a set threshold, the DU sends the third data packet through the common RLC entity. If the difference is not greater than the set threshold, the DU stores the third data packet without sending the packet, and the DU temporarily does not configure the uplink grant resource for the UE 2. After the data packet transmission process of the UE 1 ends, the DU sends the third data packet through the common RLC entity. Alternatively, the DU establishes a temporary common RLC entity, and sends the third data packet through the temporary common RLC entity. In conclusion, the DU may determine, by determining whether the RLC SN exceeds the set threshold, whether to simultaneously receive data packets of two or more UEs, that is, whether to maintain a plurality of sets of RLC parameters. In this way, a value of an idle RLC SN may be effectively used, to improve transmission efficiency of the UE.

Figure 4:
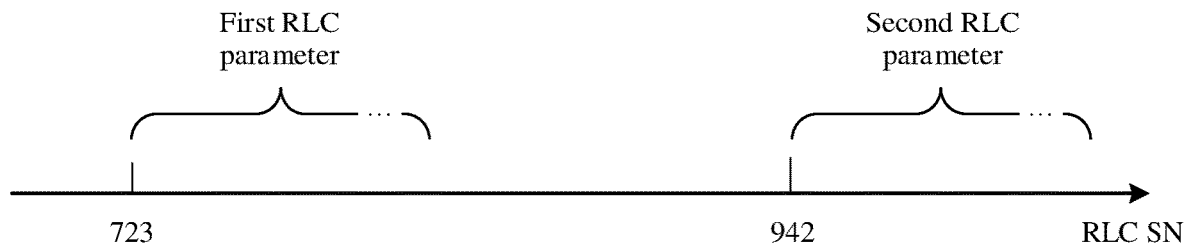
FIG. 4 is a schematic diagram of maintaining a plurality of RLC parameters of a common RLC entity by a DU according to an embodiment of this application.

For example, as shown in FIG. 4, if determining that a value 192 obtained by subtracting the first RLC parameter (for example, 750) from the RLC SN 3 (942) is greater than the set threshold 80, the DU performs S310d3.

S310d4: The DU updates a second RLC parameter of the common RLC entity to the RLC SN 3. Then, the DU may configure the uplink grant resource for the UE 2 by using the RNTI 2, and sequentially transmit data packets of the UE 2 based on the stored second RLC parameter and RLC SNs in subsequently received data packets sent by the UE 2. For a specific process, refer to the description in S309c1 to S309c4. Details are not described herein again.

Refer to FIG. 4. Based on the foregoing description, the DU may maintain the plurality of RLC parameters of the common RLC entity based on a quantity of UEs corresponding to actually received data packets. As shown in FIG. 4, the DU may maintain the first RLC parameter for the UE 1, and maintain the second RLC parameter for the UE 2.

In addition, in this embodiment of this application, each UE that accesses the base station may simultaneously send a transmission end marker (end mark) when sending the data packet for the last time, so that the DU no longer maintains the RNTI of the UE. The following uses the UE 1 as an example to describe the process through S311e1 to S311e5.

S311e1: The UE 1 generates the last data packet, that is, a fourth data packet, based on the last to-be-transmitted data, where the fourth data packet includes an RLC ID. The LCH ID in the fourth data packet meets the first preset rule, or the fourth data packet includes the first dedicated indicator.

Similar to the first data packet generated by the UE 1 in S301, the fourth data packet also includes the UE 1 ID and an RLC SN 4. The RLC SN 4 is generated by the UE 1 incrementally based on the RLC SN 2.

S311e2: The UE 1 may send a fourth data transmission message to the DU, where the fourth data transmission message includes the fourth data packet, and the fourth data packet is scrambled by the UE 1 by using the RNTI 2. The DU receives the fourth data transmission message from the UE 1, and descrambles the fourth data transmission message by using the RNTI 2, to obtain the fourth data packet. The fourth data transmission message further includes the transmission end marker.

S311e3: The DU transmits, based on the steps shown in S309c3 and S309c4, the fourth data packet through the common RLC entity.

S311e4: The DU sends a notification message to the UE 1 based on the transmission end marker in the fourth data transmission message. The notification message is used to notify the UE 1 that the data packet before the RLC SN 4 has been successfully received. Optionally, the notification message may be an RRC mode report, or may be indication information of another type. This is not limited in this embodiment of this application.

S311e5: After sending the notification message, the DU discards the RNTI of the UE 1 (RNTI 1). After receiving the notification message, the UE 1 determines that all data packets transmitted by the UE 1 have been successfully sent to the DU, and then discards the RNTI 1 allocated by the DU for the UE 1.

This embodiment of this application provides a data transmission method applied to an access network. In the method, the DU may determine whether the LCH ID in the received data packet meets the first preset rule or whether the data packet includes the first dedicated indicator, to determine whether the data packet needs to be transmitted through the common RLC entity. In this way, in some scenarios, for example, when the UEs in the RRC idle mode or the RRC inactive mode need to send small data, the UEs directly generate the data packets that include the LCH IDs that meet the first preset rule, or generate the data packets that include the first dedicated indicator, and send the data packets to the DU, so that the DU can send the data packets through the common RLC entity, and no longer perform some processes such as RRC connection resume and RLC entity establishment for these small-data UEs, to accelerate data transmission between the access network and the UEs, so that data transmission efficiency between the access network and the UEs can be improved. In addition, the DU may maintain the plurality of RLC parameters of the common RLC entity, to avoid an RLC SN conflict between different UEs, so that data transmission efficiency of the DU can be ensured.

Based on the data transmission method shown in FIG. 3A and FIG. 3B, an embodiment of this application further provides a data transmission example. In the example, a UE may transmit a data packet in a random access process. The following uses the UE 1 in the embodiment shown in FIG. 3A and FIG. 3B as an example to describe a process in which the UE 1 transmits the first data packet to the DU with reference to a data transmission example process shown in FIG. 5.

S501: When having a data transmission requirement, the UE 1 in an RRC inactive mode sends a message 1 (message 1, MSG 1) to the DU, and initiates a random access process to the DU. The MSG 1 includes a random access preamble (preamble).

S502: After receiving the MSG 1, the DU returns a message 2 (message 2, MSG 2). The MSG 2 may be a random access response (random access response, RAR). The MSG 2 includes a temporary cell RNTI (Temp Cell-RNTI, T-RNTI) allocated by the DU for the UE 1 and radio resource configuration information allocated by the DU for the UE 1. The T-RNTI is the RNTI 1 in the embodiment shown in FIG. 3A and FIG. 3B.

S503: After generating the first data packet, the UE 1 adds the first data packet to a message 3 (message 3, MSG 3), to send the first data packet to the DU, where the message 3 is scrambled by using the T-RNTI. For the process in which the UE 1 generates the first data packet, refer to the description of S301 in the embodiment shown in FIG. 3A and FIG. 3B. Details are not described herein again. It is clear that the MSG 3 in the example is the first data transmission message in the embodiment shown in FIG. 3A and FIG. 3B.

S504: After receiving the MSG 3 by using the T-RNTI, the DU sends a message 4 (message 4, MSG 4) to the UE 1. In this case, the random access process of the UE 1 is completed. The MSG 4 may be a contention resolution (contention resolution) message.

S505a1: The DU implements a transmission process of the first data packet. For details, refer to steps S303 to S307 in the embodiment shown in FIG. 3A and FIG. 3B. Details are not described herein again.

S505a2: The UE 1 promotes the T-RNTI (RNTI 1) to a formal C-RNTI.

Figure 5:
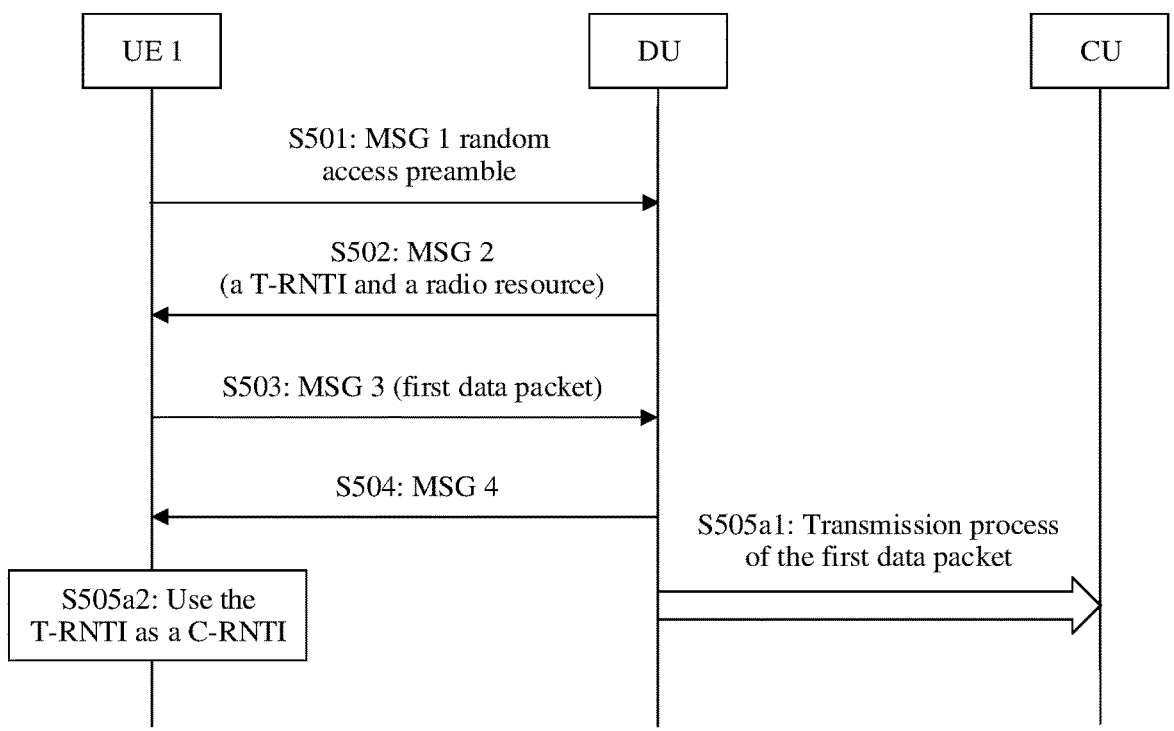
FIG. 5 is a flowchart of a data transmission example according to an embodiment of this application.

Based on the data transmission method shown in FIG. 3A and FIG. 3B and FIG. 5, an embodiment of this application further provides a data packet structure, as shown in FIG. 6. A data packet generated by each UE may be a MAC SDU. A structure of the MAC SDU may be shown in (a) in FIG. 6, and includes a MAC subheader, an RLC subheader, a PDCP subheader, an SDAP subheader, and a data payload. The MAC subheader includes an LCH ID field used to carry the LCH ID, an SN field in the RLC subheader is used to carry the RLC SN, and the PDCP subheader includes a newly added UE ID field used to carry a UE ID. In addition, in this embodiment of this application, (a) in FIG. 6 further shows a header part that may be read and explained by the DU after the data packet is sent to the DU. The header part includes the MAC subheader, the RLC subheader, and the UE ID field in the PDCP subheader. Therefore, the DU may read the LCH ID from the MAC subheader, read the RLC SN from the RLC subheader, and read the UE ID from the UE ID field in the PDCP subheader. A data packet sent by the DU to the CU is shown in (b) in FIG. 6, and includes the PDCP subheader, the SDAP subheader, and the data payload part. It should be noted that a length of the RLC SN may be configured for the UE by using RRC signaling, or may be specified in the protocol. In this embodiment of this application, an example in which the length of the RLC SN is 18 bits is used for description.

In the embodiment shown in FIG. 3A and FIG. 3B or FIG. 5, the UE may obtain the RNTI in the random access process, transmit the data packet by using the obtained RNTI, and release the RNTI when data packet transmission ends. It is clear that, although the UE has the RNTI when transmitting the first data packet, the UE has not entered the RRC connected mode. It is known that, when the UE transmits the first data packet by using the random access process in the contention-based random access mode, the radio resource used by the UE is obtained through contention. Therefore, when receiving the first data packet, the DU cannot determine a specific UE that specifically transmits the data packet. When the UE that is in a connected mode transmits the first data packet by using the random access process in the non-contention-based random access mode, the radio resource used by the UE is a dedicated radio resource allocated by the DU. Therefore, the DU may determine the random access mode of the UE based on whether the radio resource used by the UE to transmit the first data packet is the dedicated radio resource. When determining that the UE uses the non-contention-based random access mode and the UE is the small-data UE, the DU may directly transmit the first data packet through the common RLC entity. The DU does not need to decapsulate the first data packet and determine whether to transmit the first data packet through the common RLC entity by determining the LCH ID or the first dedicated indicator in the first data packet in the manner in the embodiment shown in FIG. 3A and FIG. 3B. When the DU determines that the UE uses the contention-based random access mode and/or the UE is the common UE, the manner in the embodiment shown in FIG. 3A and FIG. 3B needs to be used to further determine whether to transmit the first data packet through the common RLC entity.

Figure 7A:
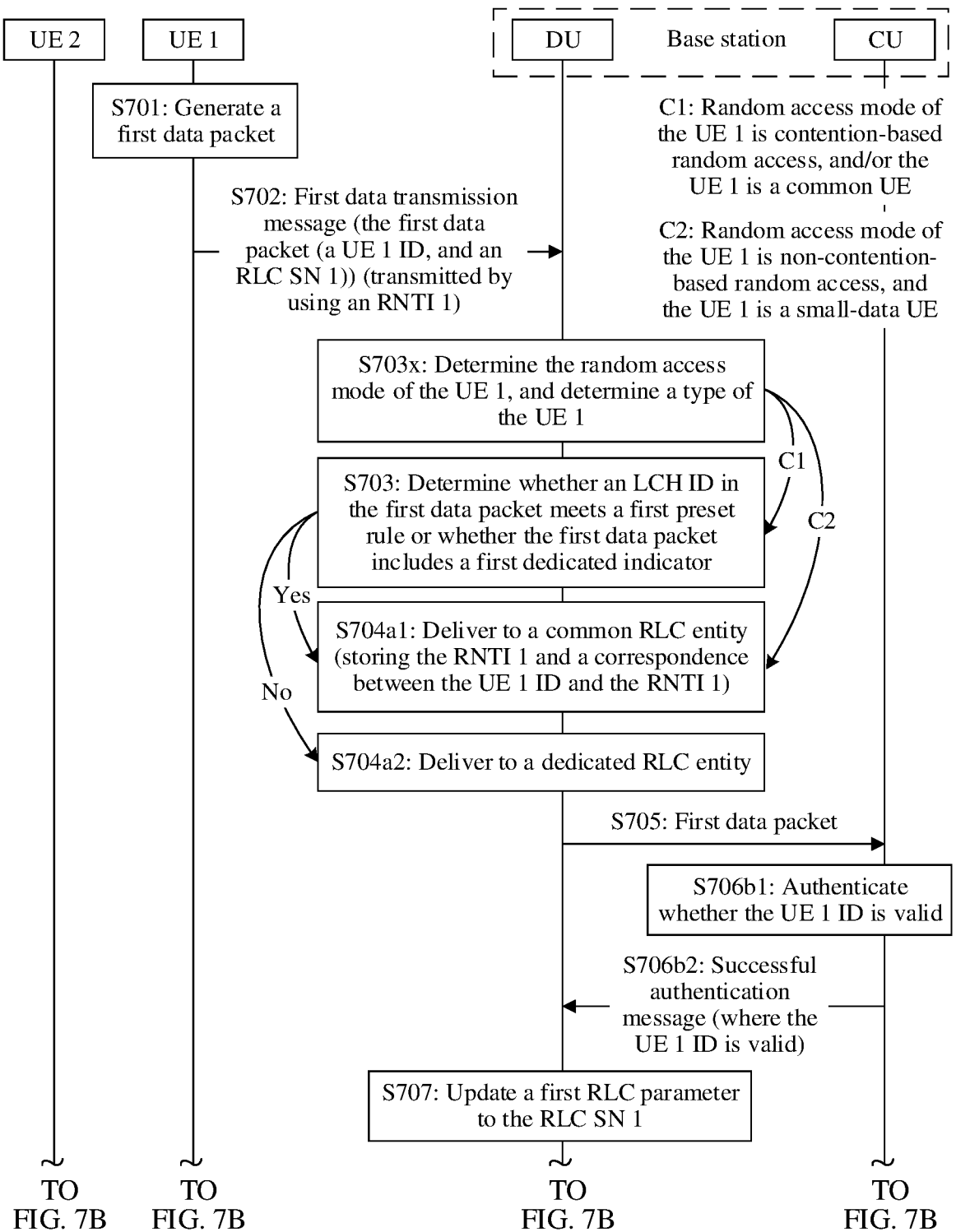
FIG. 7A and FIG. 7B are a flowchart of a data transmission method according to an embodiment of this application.
Figure 7B:
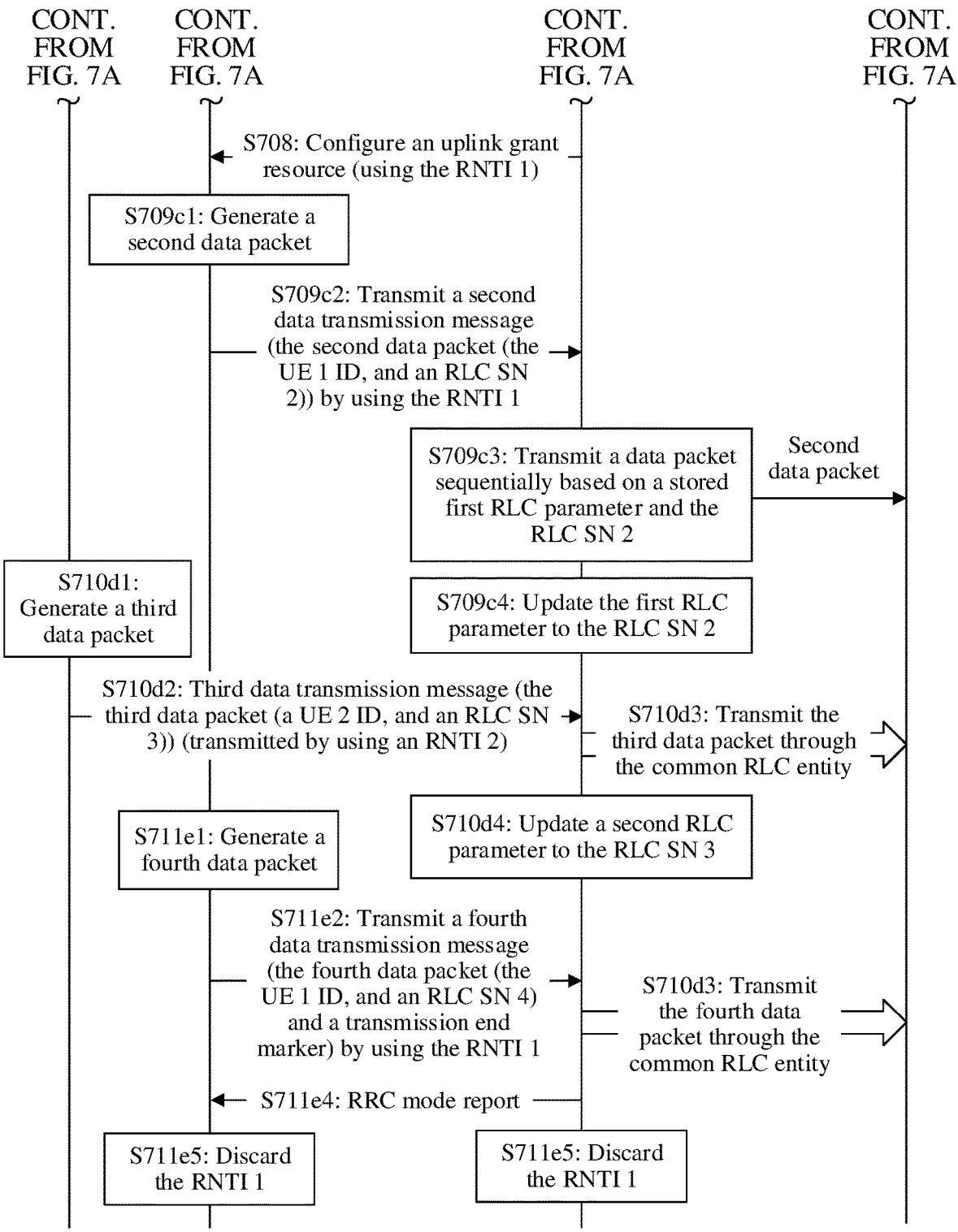

In conclusion, in this embodiment of this application, to ensure data transmission efficiency of the RAN device, the RAN may determine whether to deliver the data packet to the common RLC entity by further determining both the random access mode of the UE and the type of the UE. Therefore, an embodiment of this application further provides another data transmission method applied to an access network, as shown in FIG. 7A and FIG. 7B. The method may also be applied to the access network in the communication system shown in FIG. 1. In this embodiment of this application, a base station is deployed based on the distributed structure shown in FIG. 1. The following uses an example in which a RAN device included in the base station includes a CU module and a DU module for description. The DU includes a common RLC entity, configured to transmit data packets of a plurality of terminal devices. It should be noted that a quantity of terminal devices is not limited in this embodiment of this application. In FIG. 7A and FIG. 7B, only a UE 1 and a UE 2 are used as examples for description.

The following describes in detail the data transmission method provided in this embodiment of this application with reference to a flowchart of the data transmission method shown in FIG. 7A and FIG. 7B.

S701: When having a data transmission requirement, the UE 1 generates a first data packet based on to-be-transmitted data, where the first data packet includes an LCH ID. The first data packet may be a MAC SDU.

In an implementation, as shown in S301 in the embodiment shown in FIG. 3A and FIG. 3B, the UE 1 may set, based on factors such as a current RRC connection mode, to-be-transmitted data, target service information of a target service performed by the UE 1, and a mode of initiating a random access process, the LCH ID that meets a first preset rule in the first data packet. The LCH ID that meets the first preset rule is used to notify the DU to send a data packet that includes the LCH ID through the common RLC entity. In this implementation, for example, a structure of the first data packet may be the same as the structure of the first data packet in the embodiment shown in FIG. 3A and FIG. 3B, as shown in (a) in FIG. 6. For specific description of the first preset rule, refer to the description in the embodiment shown in FIG. 3A and FIG. 3B. Details are not described herein again.

Certainly, in another implementation, the UE 1 may further add a first dedicated indicator to the first data packet, where the first dedicated indicator is used to indicate that a data packet that includes the first dedicated indicator is sent through the common RLC entity.

It should be noted that the data packet structure shown in FIG. 6 is only an example, and cannot constitute a limitation on the structure of the first data packet. The structure of the first data packet may also be different, based on a random access process currently used when the UE 1 sends the first data packet.

S702: The UE 1 sends a first data transmission message to the DU in the accessed base station in the random access process. The DU receives the first data transmission message from the UE 1. The first data transmission message includes the first data packet. In addition, the first data transmission message varies based on a mode in which the UE 1 currently initiates the random access process.

For example, when the UE 1 uses a four-step random access process shown in S501 to S504 in FIG. 5, the first data transmission message is an MSG 3, and the first data transmission message is scrambled by the UE 1 by using the T-RNTI (RNTI 1) that is allocated by the DU for the UE 1 in S502.

For another example, when the UE 1 uses a two-step random access process, the first data transmission message is a message A (message A, MSG A). In this case, optionally, the first data transmission message may include a common control channel (common control channel, CCCH) message. When the first data transmission message includes the CCCH message, it indicates that a random access mode of the UE 1 is contention-based random access and the UE 1 is not a small-data UE. Therefore, the DU needs to deliver the first data packet to a dedicated RLC entity of the UE 1 for transmission.

S703x: The DU determines the random access mode of the UE 1, and determines a type of the UE 1. When a determining result meets a condition C1, S703 is performed. When a determining result meets a condition C2, S704a1 is performed. C1 is that the random access mode of the UE 1 is contention-based random access, and/or the UE 1 is a common UE, and C2 is that the random access mode of the UE 1 is non-contention-based random access, and the UE 1 is the small-data UE.

In an implementation, when the UE 1 uses the two-step random access process, the DU may perform S703x by using the following steps.

The DU determines whether the first data transmission message that includes the first data packet includes the CCCH message, and if determining that the first data transmission message includes the CCCH message, the DU determines that the random access mode of the UE 1 is contention-based random access, and determines that the type of the UE 1 is the common UE, or if determining that the first data transmission message does not include the CCCH message, the DU determines that the random access mode of the UE 1 is non-contention-based random access, and determines that the type of the UE 1 is the small-data UE.

It can be learned from the foregoing description that, when determining that the first data transmission message includes the CCCH message, the DU needs to perform S703.

When determining that the first data transmission message does not include the CCCH message, the DU needs to perform S704a1.

In another implementation, when the UE 1 uses a conventional random access process, the DU may determine the random access mode of the UE 1 in but not limited to the following manners.

The DU determines a target radio resource location occupied by the first data packet, and determines a stored dedicated radio resource location set, where the dedicated radio resource location set is allocated by the DU for a UE that accesses the DU in the random access mode of non-contention-based random access.

If determining that the dedicated radio resource location set includes the target radio resource location, the DU determines that the random access mode of the UE 1 is non-contention-based random access.

If determining that the dedicated radio resource location set does not include the target radio resource location, the DU determines that the random access mode of the UE 1 is contention-based random access.

The dedicated resource indicated in the dedicated radio resource location set is allocated by the DU for the UE in a connected mode using non-contention-based random access. Therefore, the DU may further determine, by determining whether the dedicated radio resource location set includes the target radio resource location occupied for sending the first data packet by the UE 1, whether the UE 1 uses the non-contention-based random access mode.

In this implementation, the DU may determine the type of the UE 1 in but not limited to the following manners.

Manner 1: The DU determines whether the LCH ID in the first data packet meets a second preset rule, and if determining that the LCH ID meets the second preset rule, the DU determines that the UE 1 is the small-data UE, or if determining that the LCH ID does not meet the second preset rule, the DU determines that the UE 1 is the common UE.

For example, similar to the first preset rule, the second preset rule may be one or a combination of the following, including the LCH ID is greater than a seventh preset value, the LCH ID is less than an eighth preset value, the LCH ID is between a ninth preset value and a tenth preset value, the LCH ID is greater than an eleventh preset value or less than a twelfth preset value, where the eleventh preset value is greater than the twelfth preset value, and a quantity of bits of the LCH ID is equal to a second set value, or set to another random bit string other than the dedicated LCH ID value (including the first preset rule).

In addition, the second preset rule may be predefined. For example, the second preset rule may be specified in a protocol, or specified by the base station and notified to the UE 1 by using a system message.

It should be noted that, after the DU determines that the UE 1 is the small-data UE, and after random access of the UE 1 is completed, the DU may add an RNTI 1 subsequently allocated for the UE 1 to an RNTI list corresponding to the small-data UE, to directly determine whether the UE 1 is the small-data UE based on the RNTI 1, so that efficiency of determining a UE type can be improved.

Manner 2: The DU determines the RNTI 1 of the UE 1 that is used for receiving the first data packet, and determines a stored RNTI set of the small-data UEs, and if determining that the RNTI set includes the RNTI 1, the DU determines that the UE 1 is the small-data UE, or if determining that the RNTI set does not include the RNTI 1, the DU determines that the UE 1 is the common UE.

S703 to S707 are the same as conventional S303 to S307, and details are not described herein again.

S708: When no RNTI is allocated for the UE 1 (to be specific, the first data transmission message is not transmitted by using the RNTI 1, for example, the UE 1 transmits the first data transmission message by using the two-step random access process), the DU allocates the RNTI 1 for the UE 1, and configures an uplink grant resource for the UE 1 by using the allocated RNTI 1. When the first data transmission message is transmitted by using the RNTI 1 of the UE 1, the DU configures the uplink grant resource for the UE 1 by using the RNTI 1.

Subsequently, the UE 1 may continue to send a data packet based on the uplink grant resource configured by the DU. The following uses transmission of a second data packet of the UE 1 as an example for description. Refer to steps S709c1 to S709c4 in FIG. 7A and FIG. 7B.

S709c1: The UE 1 generates the second data packet based on to-be-transmitted data, where the second data packet includes an LCH ID. Optionally, the LCH ID in the second data packet meets the first preset rule or includes the first dedicated indicator.

S709c2: The UE 1 may send a second data transmission message to the DU, where the second data transmission message includes the second data packet, and the second data packet is scrambled by using the RNTI 1. The DU receives the second data transmission message from the UE 1.

S709c3: The DU descrambles by using the RNTI 1 to obtain the second data packet from the second data transmission message, and determines to deliver the second data packet to the common RLC entity for transmission. Certainly, the DU may further determine, by determining whether the LCH ID in the second data packet meets the first preset rule or whether the second data packet includes the first dedicated indicator, whether to deliver the second data packet to the common RLC entity for transmission. When determining to deliver the second data packet to an RLC entity, the DU sequentially transmits the data packet based on a stored first RLC parameter and an RLC SN 2 in the second data packet.

For sequential transmission of the data packets by the DU, refer to the detailed description of sequential transmission in the embodiment shown in FIG. 3A and FIG. 3B. Details are not described herein again.

S709c4: After transmitting the data packet in sequence, the DU updates the first RLC parameter to the RLC SN 2.

In addition, in this embodiment of this application, to avoid a case in which transmission efficiency of the DU is reduced due to an RLC SN conflict between different UEs, in this embodiment of this application, the common RLC entity may have a plurality of RLC parameters. To be specific, the DU may maintain the plurality of RLC parameters of the common RLC entity for a plurality of UEs whose data packets are to be transmitted. The following uses the UE 2 as an example to describe in detail, by using S710d1 to S710d4, that the DU maintains the plurality of RLC parameters. In addition, it should be noted that there is no time relationship between the process and the foregoing process of S701 to S709c4, and time periods in which the DU transmits the data packets of the UE 1 and the UE 2 overlap to some extent.

S710d1: When having a data transmission requirement, the UE 2 generates a third data packet based on to-be-transmitted data, where the third data packet includes an LCH ID. The third data packet may be a MAC SDU.

Similar to that the UE 1 generates the first data packet in S701, the UE 2 may also set, based on various factors, the LCH ID that meets the first preset rule in the third data packet, or add the first dedicated indicator to the third data packet. Details are not described herein again. A difference lies in that the third data packet includes an identifier of the UE 2 (UE 2 ID) and a randomly generated RLC SN (RLC SN 3).

S710d2: The UE 2 sends a third data transmission message to the DU in the random access process. The DU receives the third data transmission message from the UE 2. The third data transmission message includes the third data packet. Similar to the first data transmission message in S702, the third data transmission message varies based on a mode in which the UE 2 currently initiates the random access process.

For example, when the UE 2 uses the four-step random access process shown in S501 to S504 in FIG. 5, the third data transmission message is the MSG 3, and the third data transmission message is scrambled by the UE 2 by using the T-RNTI (RNTI 2) that is allocated by the DU for the UE 2 in S502.

For another example, when the UE 2 uses the two-step random access process, the third data transmission message is the message A (MSG A). In this case, optionally, the third data transmission message may include the CCCH message.

S710d3: The DU may transmit the third data packet through the common RLC entity with reference to the data packet transmission process in S703x to S706b2. For a specific process, refer to the description of the foregoing corresponding steps. Details are not described herein again.

S710d4: The DU updates a second RLC parameter of the common RLC entity to the RLC SN 3. Then, the DU may configure the uplink grant resource for the UE 2 by using the RNTI 2, and sequentially transmit data packets of the UE 2 based on the stored second RLC parameter and RLC SNs in subsequently received data packets sent by the UE 2. For a specific process, refer to the description in S709c1 to S709c4. Details are not described herein again.

Finally, in this embodiment of this application, each UE that accesses the base station may simultaneously send a transmission end marker (end mark) when sending the data packet for the last time, so that the DU no longer maintains the RNTI of the UE. In FIG. 7A and FIG. 7B, the following uses the UE 1 as an example to describe the process through S711e1 to S711e5. In this embodiment of this application, for a process of S711e1 to S711e5, refer to the specific description of corresponding steps in S311e1 to S311e5 in the embodiment shown in FIG. 3A and FIG. 3B. Details are not described herein again.

This embodiment of this application provides a data transmission method applied to an access network. In this method, the DU may first determine, by determining the random access mode and type of the UE, whether the data packet needs to be transmitted through the common RLC entity. When determining that a condition of transmitting the data packet through the common RLC entity is not met, the DU determines, by determining whether the LCH ID in the received data packet meets the first preset rule or whether the data packet includes the first dedicated indicator, whether the data packet needs to be transmitted through the common RLC entity. In this way, in some cases, for example, when the UE in an RRC connected mode sends small data, the DU may no longer decapsulate the data packet, and obtain the LCH ID or the first dedicated indicator in the data packet, to determine to transmit the data packet through an RLC entity, so that a transmission manner of the data packet can be quickly and accurately determined, to improve transmission efficiency of the data packet. In conclusion, when the UE in the RRC connected mode sends small data, the DU may quickly and accurately determine the transmission manner of the data packet, to improve transmission efficiency of the data packet. When the UE in an RRC idle mode or an RRC inactive mode needs to send small data, the UE directly generates the data packet that includes the LCH ID that meets the first preset rule or generates the data packet that includes the first dedicated indicator, and sends the data packet to the DU, so that the DU can send the data packet through the common RLC entity. In conclusion, the DU may no longer perform some processes such as RRC connection resume and RLC entity establishment for the foregoing small-data UE, to accelerate data transmission between the access network and the UE, so that data transmission efficiency between the access network and the UE can be improved. In addition, the DU may maintain the plurality of RLC parameters of the common RLC entity, to avoid an RLC SN conflict between different UEs, so that data transmission efficiency of the DU can be ensured.

Based on the data transmission method shown in FIG. 7A and FIG. 7B, an embodiment of this application provides a data transmission example. In the example, the DU may determine, based on a plurality of factors, whether the included data packet received in the random access process needs to be transmitted through the common RLC entity. The following uses an example in which the UE 1 transmits the first data packet in the embodiment shown in FIG. 7A and FIG. 7B to describe a process in which the DU transmits the data packet with reference to a flowchart shown in FIG. 8.

S801: After the UE 1 generates the first data packet by using S701 and sends the first data transmission message that includes the first data packet to the DU in the base station by using S702, the DU receives the first data transmission message from the UE 1.

S802: The DU determines whether the first data transmission message includes the CCCH message. If the first data transmission message includes the CCCH message, the DU determines that the random access mode of the UE 1 is contention-based random access and the UE 1 is the common UE, and the DU needs to perform S806a2, to directly deliver the first data packet to a dedicated RLC entity for transmission. If the first data transmission message does not include the CCCH message, the DU performs S803 to further determine whether to deliver the first data packet to the common RLC entity for transmission.

S803: The DU further determines whether the random access mode of the UE 1 is non-contention-based random access. If the random access mode of the UE 1 is non-contention-based random access, the DU performs S804. If the random access mode of the UE 1 is not non-contention-based random access, the DU performs S805, to further determine whether to deliver the first data packet to the common RLC entity for transmission.

The DU may determine the random access mode of the UE 1 in the mode described in S703x in the embodiment shown in FIG. 7A and FIG. 7B. Details are not described herein again.

S804: The DU further determines whether the type of the UE 1 is the small-data UE. If the type of the UE 1 is the small-data UE, the DU performs S806a1, to deliver the first data packet to the common RLC entity for transmission. If the type of the UE 1 is not the small-data UE, the DU performs S805, to further determine whether to deliver the first data packet to the common RLC entity for transmission.

The DU may determine the type of the UE 1 in the two manners described in S703x in the embodiment shown in FIG. 7A and FIG. 7B. Details are not described herein again.

S805: The DU determines whether the LCH ID in the first data packet meets the first preset rule or whether the first data packet includes the first dedicated indicator. If the LCH ID in the first data packet meets the first preset rule or the first data packet includes the first dedicated indicator, the DU performs S806a1, to deliver the first data packet to the common RLC entity for transmission. If the LCH ID in the first data packet does not meet the first preset rule or the first data packet does not include the first dedicated indicator, the DU performs S806a2, to deliver the first data packet to the dedicated RLC entity for transmission.

S806a1: The DU delivers the first data packet to the common RLC entity for transmission.

S806a2: The DU delivers the first data packet to the dedicated RLC entity for transmission.

It should be noted that, for definitions and specific values of the first preset rule and the first dedicated indicator in the example, refer to specific description of corresponding nouns in embodiments shown in FIG. 3A and FIG. 3B and FIG. 7A and FIG. 7B. Details are not described herein again.

Figure 8:
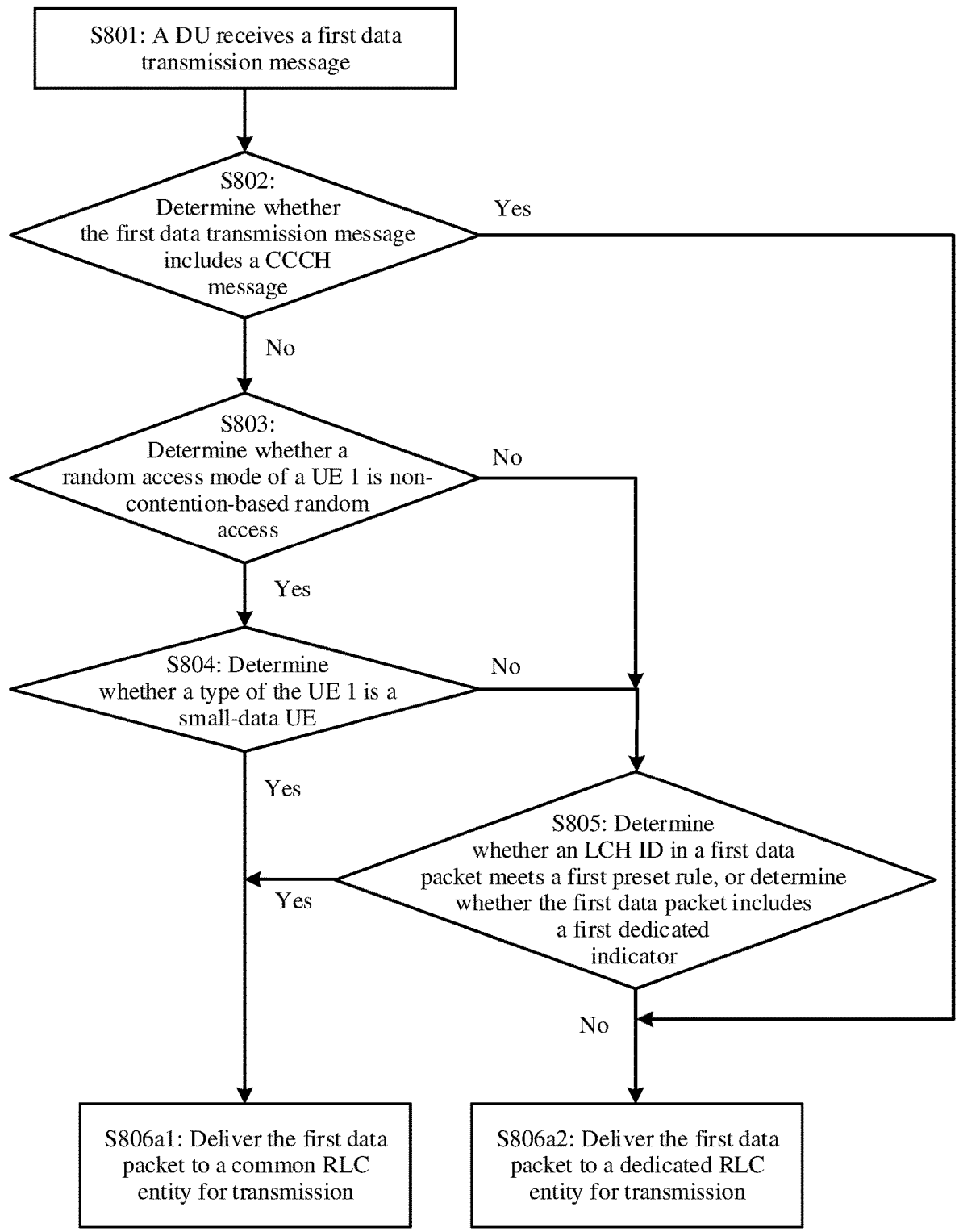
FIG. 8 is a flowchart of a data transmission example according to an embodiment of this application.

It should be noted that the example shown in FIG. 8 does not limit a process in which the DU transmits the data packet. Various modifications and variations made based on the process shown in FIG. 8 also fall within the scope of embodiments of this application. For example, the DU may first perform S804, and then perform S803, or the DU may simultaneously perform S803 and S804.

In embodiments shown in FIG. 3A and FIG. 3B and FIG. 7A and FIG. 7B of this application, it is recorded that the DU may maintain the plurality of RLC parameters of the common RLC entity for the plurality of UEs whose data packets are to be transmitted. However, during actual application, when the plurality of UEs are all indicated to transmit the data packets through the common RLC entity, the DU may determine whether the plurality of RLC parameters need to be maintained simultaneously. For example, it is assumed that the $1^{st}$ data packet transmitted by each UE to the DU is transmitted by using a contended resource. If the DU receives the $1^{st}$ data packet transmitted by a UE A, an RLC SN 1 of the first data packet is 723, and the DU receives the $1^{st}$ data packet transmitted by a UE B, where the $1^{st}$ data packet includes an RLC SN 2. It is assumed that the RLC SN 2=942. If determining that a difference between the RLC SN 2 and the RLC SN 1 is greater than a set threshold (80), the DU determines to use one common RLC entity to transmit data packets of the two UEs, and enables two RLC parameters of the common RLC entity to simultaneously process data packet transmission services of the two UEs, as shown in FIG. 4. It is assumed that the RLC SN=792. If determining that the difference between the RLC SN 2 and the RLC SN 1 is less than the set threshold, the DU temporarily does not allocate a radio resource for the UE B. The DU allocates the radio resource for the UE B after a data transmission process of the UE A ends, or the DU establishes a temporary common RLC entity for the UE B to process a data packet transmission service of the UE B, and deletes the temporary common RLC entity after data transmission of the UE B ends. A value of the set threshold may be determined by the DU, or may be determined and configured by the CU for the DU.

Figure 9:
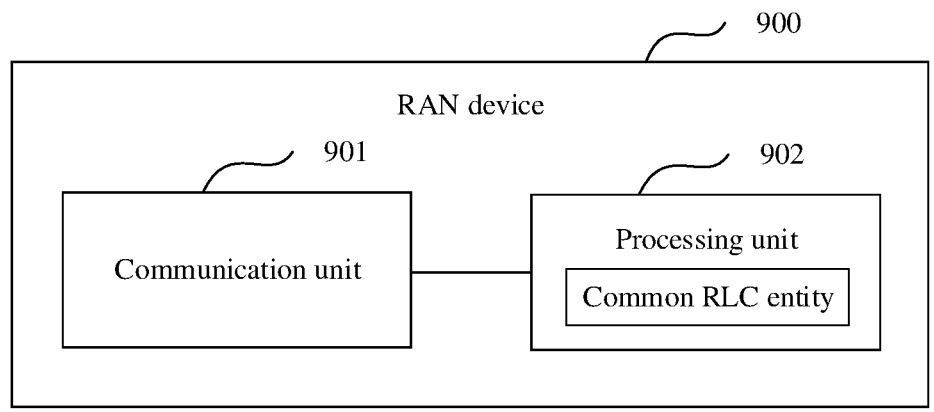
FIG. 9 is a schematic diagram of a structure of a RAN device according to an embodiment of this application.

Based on a same technical concept, this application further provides a RAN device. A structure of the RAN device is shown in FIG. 9, and the RAN device includes a communication unit 901 and a processing unit 902. The RAN device 900 may be applied to the communication system shown in FIG. 1, and may implement the communication method provided in the foregoing embodiments and examples. For example, the RAN device 900 may be a DU. The RAN device 900 includes a common RLC entity that can transmit data packets of a plurality of UEs. The following describes functions of the units in the DU 900.

The communication unit 901 is configured to receive a first data packet from a first terminal device, where the first data packet includes a logical channel identifier LCH ID.

The processing unit 902 is configured to determine whether the LCH ID meets a first preset rule, and if determining that the LCH ID meets the first preset rule, send the first data packet through the common RLC entity. As shown in the figure, the common RLC entity is established by the processing unit 902 and maintained inside the processing unit 902.

In an implementation, when sending the first data packet through the common RLC entity, the processing unit 902 is specifically configured to determine target service information corresponding to the first preset rule, determine the common RLC entity based on the target service information, where the common RLC entity is configured to transmit a data packet of a target service indicated by the target service information, and send the first data packet through the common RLC entity.

In an implementation, when receiving the first data packet from the first terminal device, the communication unit 901 is specifically configured to: receive the first data packet from the first terminal device by using a first radio network temporary identifier RNTI of the first terminal device.

The processing unit 902 is further configured to: after sending the first data packet through the common RLC entity, determine that the communication unit 901 receives a second data packet from the first terminal device by using the first RNTI, and send the second data packet through the common RLC entity.

In an implementation, the first data packet further includes an identifier of the first terminal device, and the processing unit 902 is further configured to: after the communication unit 901 receives the first data packet from the first terminal device, store a correspondence between the identifier of the first terminal device and the first RNTI, after sending the first data packet through the common RLC entity, receive a successful authentication message from a centralized unit CU, and determine, based on the successful authentication message, that the identifier of the first terminal device is valid, and determine, based on the stored correspondence between the identifier of the first terminal device and the first RNTI, that the first RNTI is valid.

In an implementation, the first data packet further includes a first RLC sequence number SN, the second data packet further includes a second RLC SN, the first RLC SN is a positive integer, and the second RLC SN is a positive integer, and the processing unit 902 is further configured to: after sending the first data packet through the common RLC entity, update a first RLC parameter of the common RLC entity to the first RLC SN.

When sending the second data packet through the common RLC entity, the processing unit 902 is specifically configured to: determine whether the second RLC SN is equal to the first RLC SN+1, and if the second RLC SN is equal to the first RLC SN+1, send the second data packet through the common RLC entity, and update the first RLC parameter to the second RLC SN, or if the second RLC SN is not equal to the first RLC SN+1, store the second data packet, continue to receive a data packet from the first terminal device through the communication unit 901, until it is determined that at least one target data packet is locally stored, send the target data packet and the second data packet through the common RLC entity, and update the first RLC parameter to the second RLC SN, where a quantity of the at least one target data packet is equal to a difference between the second RLC SN and the first RLC SN+1, a target RLC SN included in each target data packet is a positive integer between the first RLC SN and the second RLC SN, and the target RLC SN included in the target data packet is different.

In an implementation, the communication unit 901 is further configured to receive a third data packet from a second terminal device, where the third data packet includes a third RLC SN.

The processing unit 902 is further configured to send the third data packet through the common RLC entity, and update a second RLC parameter of the common RLC entity to the third RLC SN.

In an implementation, the processing unit 902 is further configured to: before sending the third data packet through the common RLC entity, determine that a difference between the third RLC SN and the first RLC parameter is greater than a set threshold.

In an implementation, when determining whether the LCH ID meets the first preset rule, the processing unit 902 is specifically configured to: determine a random access mode of the first terminal device, and determine a type of the first terminal device, and if determining that the random access mode of the first terminal device is contention-based random access, and/or determining that the first terminal device is a common terminal device, determine whether the LCH ID meets the first preset rule.

In an implementation, the processing unit 902 is further configured to: if determining that the random access mode of the first terminal device is non-contention-based random access, and determining that the first terminal device is a terminal device for small data transmission, send the first data packet through the common RLC entity.

In an implementation, when determining the random access mode of the first terminal device and determining the type of the first terminal device, the processing unit 902 is specifically configured to: determine whether a first data transmission message that includes the first data packet includes a common control channel CCCH message, and if determining that the first data transmission message includes the CCCH message, determine that the random access mode of the first terminal device is contention-based random access, and determine that the type of the first terminal device is the common terminal device, or if determining that the first data transmission message does not include the CCCH message, determine that the random access mode of the first terminal device is non-contention-based random access, and determine that the type of the first terminal device is the terminal device for small data transmission.

In an implementation, when determining the random access mode of the first terminal device, the processing unit 902 is specifically configured to: determine a target radio resource location occupied by the first data packet, and determine a stored dedicated radio resource location set, where the dedicated radio resource location set is allocated by the DU for a terminal device that accesses the DU in the random access mode of non-contention-based random access, and if determining that the dedicated radio resource location set includes the target radio resource location, determine that the random access mode of the first terminal device is non-contention-based random access, or if determining that the dedicated radio resource location set does not include the target radio resource location, determine that the random access mode of the first terminal device is contention-based random access.

In an implementation, when determining the type of the first terminal device, the processing unit 902 is specifically configured to: determine whether the LCH ID meets a second preset rule, if determining that the LCH ID meets the second preset rule, determine that the first terminal device is the terminal device for small data transmission, or if determining that the LCH ID does not meet the second preset rule, determine that the first terminal device is the common terminal device, or determine the first RNTI of the first terminal device that is used for receiving the first data packet, and determine a stored RNTI set of terminal devices that transmit small data, and if determining that the RNTI set includes the first RNTI, determine that the first terminal device is the terminal device for small data transmission, or if determining that the RNTI set does not include the first RNTI, determine that the first terminal device is the common terminal device.

It should be noted that in the foregoing embodiments of this application, division into the modules is an example and is only logical function division, and there may be another division manner during actual implementation. In addition, functional units in embodiments of this application may be integrated into one processing unit, or may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

Figure 10:
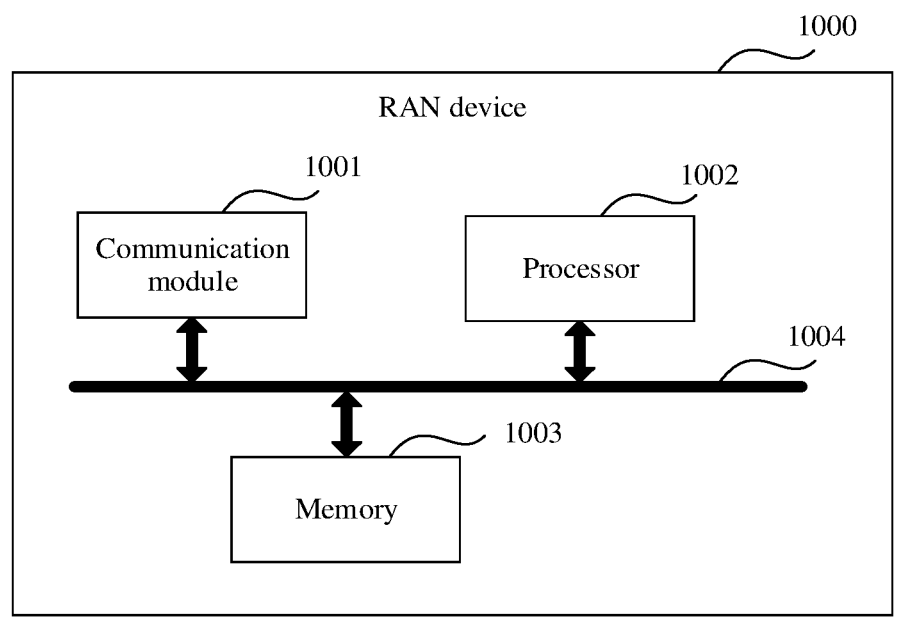
FIG. 10 is a schematic diagram of a structure of another RAN device according to an embodiment of this application.

Based on a same technical concept, this application further provides a RAN device. The RAN device 900, applicable to the communication system shown in FIG. 1, has functions of the RAN device in the embodiment shown in FIG. 9, and may implement the data transmission method according to the foregoing embodiments and examples. For example, the RAN device 900 may be a DU. Refer to FIG. 10. A RAN device 1000 includes a communication module 1001, a processor 1002, and a memory 1003. The communication module 1001, the processor 1002, and the memory 1003 are connected to each other.

Optionally, the communication module 1001, the processor 1002, and the memory 1003 are connected to each other through a bus 1004. The bus 1004 may be a peripheral component interconnect (peripheral component interconnect, PCI) bus, an extended industry standard architecture (extended industry standard architecture, EISA) bus, and or the like. The bus may be classified into an address bus, a data bus, a control bus, and the like. For ease of representation, only one thick line is for representing the bus in FIG. 10, but this does not mean that there is only one bus or only one type of bus.

The communication module 1001 is configured to receive and send data, to implement communication interaction with another device. The communication module 1001 includes a transceiver and a communication interface. For example, the RAN device 1000 may receive, through the transceiver in the communication module 1001, a message sent by a terminal device, and the RAN device 1000 may send data to the CU through the communication interface in the communication module 1001.

A common RLC entity is maintained inside the processor 1002, and a dedicated RLC entity can be established for a single terminal device. For a specific function of the processor 1002, refer to the description in the data transmission method according to the foregoing embodiments and examples, and the specific function description of the RAN device 900 in the embodiment shown in FIG. 9. Details are not described herein again.

The memory 1003 is configured to store program instructions, data, and the like. Specifically, the program instructions may include program code, where the program code includes computer operation instructions. The memory 1003 may include a random access memory (random access memory, RAM), or may be a non-volatile memory (non-volatile memory), for example, at least one magnetic disk memory. The processor 1002 executes the program instructions stored in the memory 1003, and implements the foregoing functions by using the data stored in the memory 1003, to implement the data transmission method according to the foregoing embodiments.

It may be understood that, in FIG. 10 of this application, the memory 1003 may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

Based on the foregoing embodiments, an embodiment of this application further provides a computer program. When the computer program is run on a computer, the computer is enabled to perform the data transmission method according to the foregoing embodiments.

Based on the foregoing embodiments, an embodiment of this application further provides a computer-readable storage medium. The computer-readable storage medium stores a computer program. When the computer program is executed by a computer, the computer is enabled to perform the data transmission method according to the foregoing embodiments.

The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer.

Based on the foregoing embodiments, an embodiment of this application further provides a chip. The chip is configured to: read a computer program stored in a memory, and perform the data transmission method according to the foregoing embodiments.

Based on the foregoing embodiments, an embodiment of this application provides a chip system. The chip system includes a processor, configured to support a computer apparatus in implementing functions of a service device, a forwarding device, or a station device according to the foregoing embodiments. In a possible design, the chip system further includes a memory, and the memory is configured to store a program and data that are necessary for the computer apparatus. The chip system may include a chip, or may include a chip and another discrete component.

In conclusion, embodiments of this application provide a data transmission method applied to an access network and a device. In the method, after receiving a data packet of the terminal device, the DU in the access network determines whether the LCH ID included in the data packet meets the first preset rule. If the LCH ID included in the data packet meets the first preset rule, the DU in the access network sends the first data packet through the common RLC entity. In this way, in some scenarios, for example, when the terminal device in the RRC idle mode or the RRC inactive mode needs to send small data, the terminal device generates the data packet that includes the LCH ID that meets the first preset rule, and sends the data packet to the DU. After determining that the LCH ID in the received data packet meets the first preset rule, the DU may directly send the data packet through the common RLC entity. According to this solution, in some scenarios, the DU may no longer perform some processes such as RRC connection resume and RLC entity establishment for the terminal device, to accelerate data transmission between the access network and the terminal device, so that data transmission efficiency between the access network and the terminal device can be improved.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to this application without departing from the protection scope of this application. This application is intended to cover these modifications and variations of this application provided that they fall within the scope of the following claims and their equivalent technologies.

What is claimed is:

1. A method, comprising:
    receiving, by a radio access network (RAN) device of an access network, a first data packet from a first terminal device, wherein the first data packet comprises a logical channel (LCH) identifier (ID);
    determining, by the RAN device, whether the LCH ID meets a first preset rule; and
    in response to determining that the LCH ID meets the first preset rule, sending, by the RAN device, the first data packet through a common radio link control (RLC) entity, wherein the common RLC entity is maintained independently of release of data radio bearers (DRBs) of a plurality of terminal devices corresponding to the common RLC entity.

2. The method according to claim 1, wherein the sending, by the RAN device, the first data packet through the common RLC entity comprises:
    determining, by the RAN device, target service information corresponding to the first preset rule;
    determining, by the RAN device, the common RLC entity based on the target service information, wherein the common RLC entity is configured to transmit a data packet of a target service indicated by the target service information; and
    sending, by the RAN device, the first data packet through the common RLC entity.

3. The method according to claim 1, wherein the receiving, by the RAN device, the first data packet from the first terminal device comprises:
  receiving, by the RAN device, the first data packet from the first terminal device by using a first radio network temporary identifier (RNTI) of the first terminal device, and wherein the method further comprises:
  after the sending, by the RAN device, the first data packet through a common RLC entity:
    receiving, by the RAN device, a second data packet from the first terminal device by using the first RNTI; and
    sending, by the RAN device, the second data packet through the common RLC entity.

4. The method according to claim 3, wherein the first data packet further comprises an identifier of the first terminal device, and wherein the method further comprises:
  after the receiving, by the RAN device, the first data packet from the first terminal device:
    storing, by the RAN device, a correspondence between the identifier of the first terminal device and the first RNTI; and
  after the sending, by the RAN device, the first data packet through the common RLC entity:
    receiving, by the RAN device, a successful authentication message from a centralized unit (CU);
    determining, based on the successful authentication message, that the identifier of the first terminal device is valid; and
    determining, by the RAN device, based on the correspondence between the identifier of the first terminal device and the first RNTI, that the first RNTI is valid.

5. The method according to claim 3, wherein the first data packet further comprises a first RLC sequence number (SN), the second data packet further comprises a second RLC SN, the first RLC SN is a first positive integer, and the second RLC SN is a second positive integer, and wherein the method further comprises:
  after the sending, by the RAN device, the first data packet through the common RLC entity, updating, by the RAN device, a first RLC parameter of the common RLC entity to the first RLC SN;
  after the sending, by the RAN device, the second data packet through the common RLC entity, updating, by the RAN device, the first RLC parameter to the second RLC SN;
  receiving, by the RAN device, a third data packet from a second terminal device, wherein the third data packet comprises a third RLC SN;
  sending, by the RAN device, the third data packet through the common RLC entity; and
  updating a second RLC parameter of the common RLC entity to the third RLC SN.

6. The method according to claim 5, wherein the method further comprises:
  before the sending, by the RAN device, the third data packet through the common RLC entity:
    determining, by the RAN device, that a difference between the third RLC SN and the first RLC parameter is greater than a set threshold.

7. The method according to claim 1, wherein the determining, by the RAN device, whether the LCH ID meets the first preset rule comprises:
  determining, by the RAN device, a random access mode of the first terminal device;
  determining a type of the first terminal device; and
  responsive to at least one of determining that the random access mode of the first terminal device is contention-based random access or determining that the first terminal device is a common terminal device:
    determining, by the RAN device, whether the LCH ID meets the first preset rule.

8. The method according to claim 7, wherein the method further comprises:
  responsive to determining that the random access mode of the first terminal device is non-contention-based random access and determining that the first terminal device is a terminal device for small data transmission:
    sending, by the RAN device, the first data packet through the common RLC entity.

9. The method according to claim 7, wherein the determining, by the RAN device, the random access mode of the first terminal device and the determining the type of the first terminal device comprise:
  determining, by the RAN device, whether a first data transmission message including the first data packet comprises a common control channel (CCCH) message; and
  responsive to determining that the first data transmission message comprises the CCCH message, determining, by the RAN device, that the random access mode of the first terminal device is the contention-based random access, and determining that the type of the first terminal device is the common terminal device; or
  responsive to determining that the first data transmission message does not comprise the CCCH message, determining, by the RAN device, that the random access mode of the first terminal device is non-contention-based random access, and determining that the type of the first terminal device is a terminal device for small data transmission.

10. A radio access network (RAN) device, wherein the RAN device comprises a common radio link control (RLC) entity, and the RAN device further comprises:
  at least one processor; and
  a non-transitory computer readable storage medium storing programming, the programming including instructions that, when executed by the at least one processor, cause the RAN device to perform operations including:
    receiving a first data packet from a first terminal device, wherein the first data packet comprises a logical channel (LCH) identifier (ID);
    determining whether the LCH ID meets a first preset rule; and
    in response to determining that the LCH ID meets the first preset rule, sending the first data packet through the common RLC entity, wherein the common RLC entity is maintained independently of release of data radio bearers (DRBs) of a plurality of terminal devices corresponding to the common RLC entity.

11. The RAN device according to claim 10, wherein the sending the first data packet through the common RLC entity comprises:
  determining target service information corresponding to the first preset rule;
  determining the common RLC entity based on the target service information, wherein the common RLC entity is configured to transmit a data packet of a target service indicated by the target service information; and
  sending the first data packet through the common RLC entity.

12. The RAN device according to claim 10, wherein the receiving the first data packet from the first terminal device comprises:
receiving the first data packet from the first terminal device by using a first radio network temporary identifier (RNTI) of the first terminal device, and wherein the operations further include:
after the sending the first data packet through the common RLC entity:
receiving a second data packet from the first terminal device by using the first RNTI; and
sending the second data packet through the common RLC entity.

13. The RAN device according to claim 12, wherein the first data packet further comprises an identifier of the first terminal device, and wherein the operations further comprise:
after the receiving the first data packet from the first terminal device:
storing a correspondence between the identifier of the first terminal device and the first RNTI;
after the sending the first data packet through the common RLC entity:
receiving a successful authentication message from a centralized unit (CU);
determining, based on the successful authentication message, that the identifier of the first terminal device is valid; and
determining, based on the correspondence between the identifier of the first terminal device and the first RNTI, that the first RNTI is valid.

14. The RAN device according to claim 12, wherein the first data packet further comprises a first RLC sequence number (SN), the second data packet further comprises a second RLC SN, the first RLC SN is a first positive integer, and the second RLC SN is a second positive integer, and wherein the operations further comprise:
receiving a third data packet from a second terminal device, wherein the third data packet comprises a third RLC SN;
after the sending the first data packet through the common RLC entity, updating a first RLC parameter of the common RLC entity to the first RLC SN;
after the sending the second data packet through the common RLC entity, updating the first RLC parameter to the second RLC SN; and
the receiving the third data packet:
sending the third data packet through the common RLC entity; and
updating a second RLC parameter of the common RLC entity to the third RLC SN.

15. The RAN device according to claim 14, the operations further comprising:
before the sending the third data packet through the common RLC entity:
determining that a difference between the third RLC SN and the first RLC parameter is greater than a set threshold.

16. The RAN device according to claim 10, wherein the determining whether the LCH ID meets the first preset rule comprises:
determining a random access mode of the first terminal device, and determining a type of the first terminal device; and
responsive to at least one of determining that the random access mode of the first terminal device is contention-based random access or determining that the first terminal device is a common terminal device:
determining whether the LCH ID meets the first preset rule.

17. The RAN device according to claim 16, the operations further comprising:
responsive to determining that the random access mode of the first terminal device is non-contention-based random access and determining that the first terminal device is a terminal device for small data transmission:
sending the first data packet through the common RLC entity.

18. The RAN device according to claim 16, wherein the determining the random access mode of the first terminal device and the determining the type of the first terminal device comprise:
determining whether a first data transmission message including the first data packet comprises a common control channel (CCCH) message; and
responsive to determining that the first data transmission message comprises the CCCH message, determining that the random access mode of the first terminal device is the contention-based random access, and determine that the type of the first terminal device is the common terminal device; or
responsive to determining that the first data transmission message does not comprise the CCCH message, determining that the random access mode of the first terminal device is non-contention-based random access, and determining that the type of the first terminal device is a terminal device for small data transmission.

19. A non-transitory computer-readable medium having instructions stored thereon that, when executed by a radio access network (RAN) device, cause the RAN device to perform operations, the operations comprising:
receiving a first data packet from a first terminal device, wherein the first data packet comprises a logical channel (LCH) identifier (ID);
determining whether the LCH ID meets a first preset rule; and
in response to determining that the LCH ID meets the first preset rule, sending the first data packet through a common radio link control (RLC) entity, wherein the common RLC entity is maintained independently of release of data radio bearers (DRBs) of a plurality of terminal devices corresponding to the common RLC entity.

20. The non-transitory computer-readable medium according to claim 19, wherein the sending the first data packet through the common RLC entity comprises:
determining target service information corresponding to the first preset rule;
determining the common RLC entity based on the target service information, wherein the common RLC entity is configured to transmit a data packet of a target service indicated by the target service information; and
sending the first data packet through the common RLC entity.

* * * * *